(12) United States Patent
Katayama et al.

(10) Patent No.: US 6,836,564 B2
(45) Date of Patent: Dec. 28, 2004

(54) IMAGE DATA COMPRESSING METHOD AND APPARATUS WHICH COMPRESS IMAGE DATA SEPARATELY BY MODIFYING COLOR

(75) Inventors: Osamu Katayama, Nagoya (JP); Hiroshi Uesugi, Nagoya (JP); Yoji Morishita, Kariya (JP)

(73) Assignee: Denso Corporation, Kariya (JP)

( * ) Notice: Subject to any disclaimer, the term of this patent is extended or adjusted under 35 U.S.C. 154(b) by 679 days.

(21) Appl. No.: 09/827,179

(22) Filed: Apr. 6, 2001

(65) Prior Publication Data

US 2001/0036308 A1 Nov. 1, 2001

(30) Foreign Application Priority Data

Apr. 28, 2000 (JP) ........................................ 2000-130177
Nov. 6, 2000 (JP) ........................................ 2000-337642
Dec. 26, 2000 (JP) ........................................ 2000-394887

(51) Int. Cl.[7] ............................. G06K 9/00; G06K 9/36
(52) U.S. Cl. ...................... 382/166; 382/173; 382/232; 382/282; 345/593
(58) Field of Search ................................ 345/589–593, 345/600–602; 348/222.1, 391.1; 358/1.9, 517, 518, 537–540; 382/162–167, 232, 235, 239, 248, 173, 282; 709/246, 247

(56) References Cited

U.S. PATENT DOCUMENTS

| | | | |
|---|---|---|---|
| 3,997,912 A | * 12/1976 | Zsagar | ........................ 358/530 |
| 4,586,027 A | 4/1986 | Tsukiyama et al. | |
| 4,872,009 A | 10/1989 | Tsukiyama et al. | |
| 5,212,742 A | * 5/1993 | Normile et al. | ............. 382/166 |
| 5,649,025 A | * 7/1997 | Revankar | ..................... 382/171 |
| 5,704,020 A | 12/1997 | Hanyu et al. | |
| 5,761,349 A | 6/1998 | Inatome et al. | |
| 5,819,289 A | * 10/1998 | Sanford et al. | ........... 707/104.1 |
| 5,850,261 A | * 12/1998 | Kondo et al. | ........... 375/240.24 |
| 5,926,563 A | * 7/1999 | Yamazaki | .................... 382/167 |
| 5,937,099 A | * 8/1999 | Takaoka | ..................... 382/239 |
| 5,974,172 A | * 10/1999 | Chen | .......................... 382/166 |
| 6,002,847 A | * 12/1999 | Silverbrook | ............... 358/1.17 |
| 6,014,133 A | * 1/2000 | Yamakado et al. | ......... 345/501 |
| 6,028,961 A | 2/2000 | Shimomura | |
| 6,058,211 A | * 5/2000 | Bormans et al. | ............ 382/235 |
| 6,088,395 A | * 7/2000 | Wang et al. | ................ 375/240 |
| 6,208,761 B1 | * 3/2001 | Passaggio et al. | .......... 382/237 |
| 6,244,514 B1 | * 6/2001 | Otto | ............................ 235/492 |
| 6,668,021 B2 | * 12/2003 | Shimizu et al. | .......... 375/240.2 |

FOREIGN PATENT DOCUMENTS

| | | |
|---|---|---|
| JP | A-6-152973 | 5/1994 |
| JP | A-8-279913 | 10/1996 |
| JP | A-10-178528 | 6/1998 |
| JP | A-2000-013605 | 1/2000 |

OTHER PUBLICATIONS

Japanese Office Action dated Mar. 9, 2004.

* cited by examiner

*Primary Examiner*—Bhavesh M. Mehta
*Assistant Examiner*—Yubin Hung
(74) *Attorney, Agent, or Firm*—Posz & Bethards, PLC

(57) ABSTRACT

An image data compressing apparatus comprises a color selecting unit, a data separating unit and a data compressing unit. The selecting unit selects an arbitrary color contained in an original map image. The separating unit separates the original image data into a modified color data and a selected position data. The compressing unit compresses these data separately from each other to improve data compression efficiency. The modified color data may be data in which a color of a background portion is made equal to a color of a road, and the background color may be a color which is most popularly used.

76 Claims, 20 Drawing Sheets

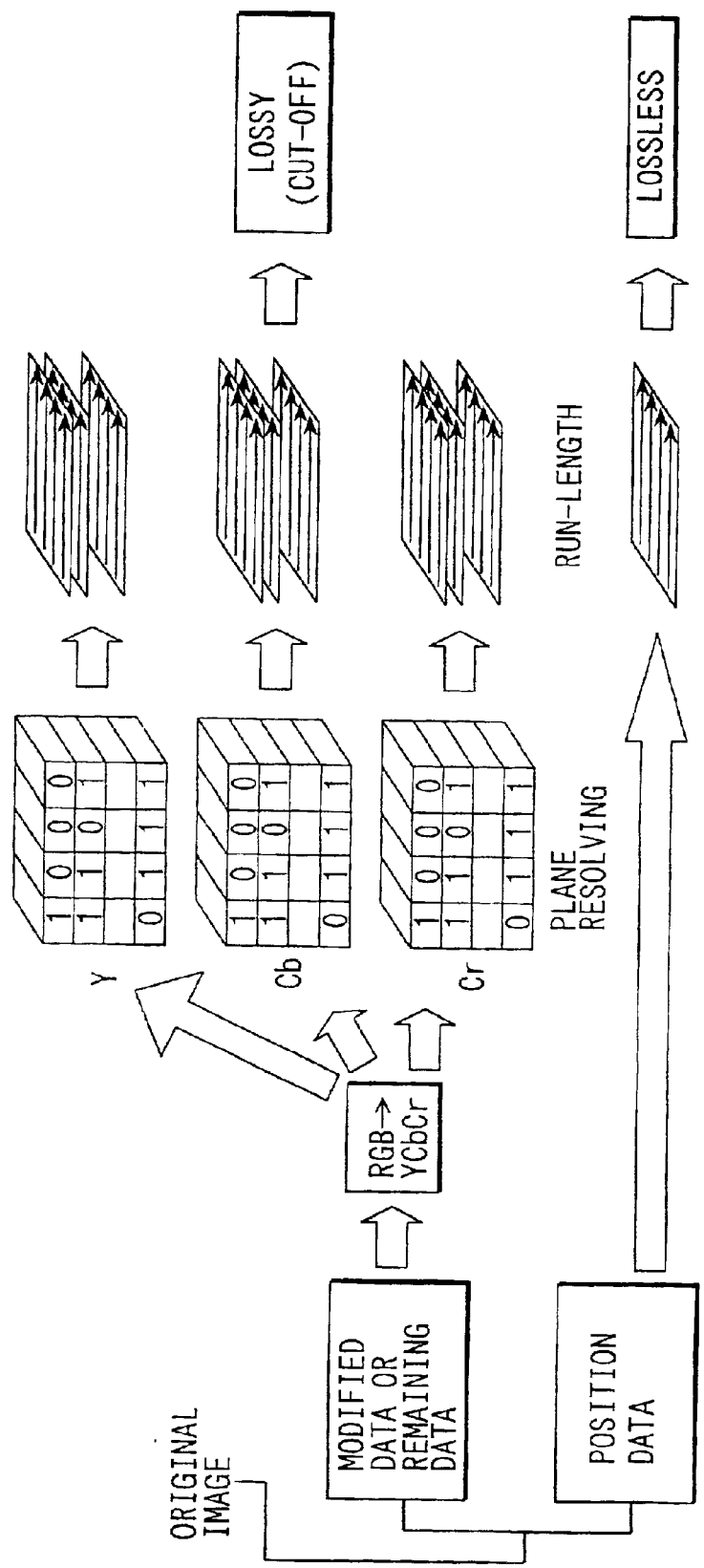

IMAGE DATA COMPRESSING METHOD AND APPARATUS WHICH COMPRESS IMAGE DATA SEPARATELY BY MODIFYING COLOR

CROSS REFERENCE TO RELATED APPLICATION

This application is based on and incorporates herein by reference Japanese patent applications No. 2000-130177 filed Apr. 28, 2000, No. 2000-337642 filed Nov. 6, 2000, and No. 2000-394887 filed Dec. 26, 2000.

BACKGROUND OF THE INVENTION

The present invention generally relates to an apparatus and method capable of compressing image data in a higher image data compression ratio. More specifically, the present invention relates to an image data compressing method and apparatus that compresses image data separately by modifying color.

Resolving of image data is considerably increased in image display technical fields. To display images, frame buffer memories having very large capacities are required, which are a for multi-value data indicative of multiple gradation and also for primary color data constituting a color. In addition, in order to improve data transfer speeds, these frame buffer memories are built in an IC (integrated circuit). However, this technical solution would cause a cost-up problem. On the other hand, in the case that such a method for cutting out lower-grade bits of image data having lower importance degrees is simply employed to reduce a total data amount, image qualities of resultant images would be readily degraded.

SUMMARY OF THE INVENTION

It is therefore an object of the present invention to increase an image data compression ratio, while minimizing degradation of image qualities.

According to the present invention, an image data compressing apparatus comprises, a color selecting unit, a data separating unit and a data compressing unit. The color selecting unit selects an arbitrary color from an original image data. The data separating unit separates the image data into modified data and position data. The modified data is produced by modifying or eliminating a color of an image portion from the image data selected by the color selecting unit. The position data indicates a position where the color image portion selected by the color selecting unit is present. The data compressing unit compresses the modified data and the position data separately. This apparatus is particularly useful for ensuring high continuity of data and increasing data compression.

Preferably, the data separating unit separates the image data into position data, remaining data and all-position data, and separates sequentially the position data into position data and an image in an order of predetermined selected colors. The selected colors are located in the position data, and the image is produced by extracting the selected colors. The compressing unit compresses the remaining data, the all-position data and the position data of each of the selected colors separately.

Preferably, a reconstructing unit is provided for reconstructing a color palette prior to a data converting operation by a data converting unit in the data compressing unit in such a manner that indexes of pixels are approximated to be close to each other, and the pixels are continued in a data processing sequence within the image data.

BRIEF DESCRIPTION OF THE DRAWINGS

For a better understanding of the present invention, reference is made to the accompanying drawings. In the drawings:

FIG. 3 is an explanatory diagram showing general operations of the first embodiment in which a map image is separated to be compressed;

DETAILED DESCRIPTION OF THE PREFERRED EMBODIMENT

The present invention will be described in more detail with reference to various embodiments which are directed to a map display of a vehicle navigation system.

(First Embodiment)

Figure 1A:
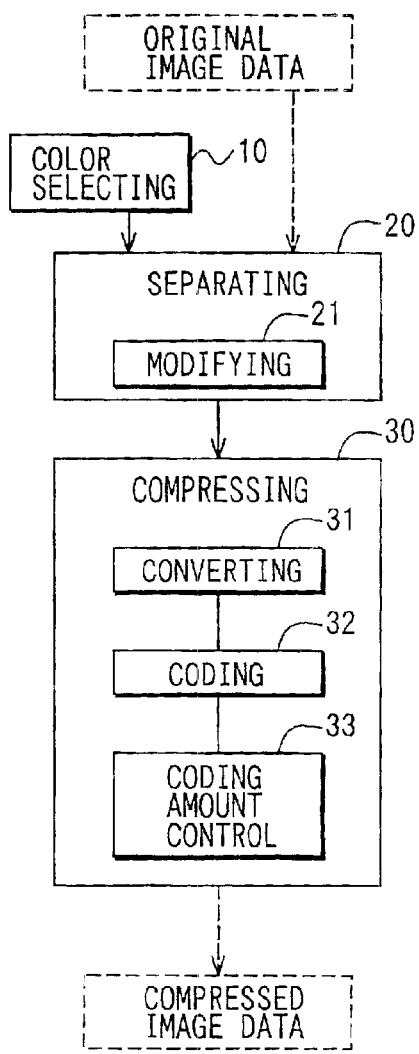
FIG. 1A and FIG. 1B are block diagrams schematically showing an arrangement of an apparatus and a method for an image data compression according to a first embodiment of the present invention, respectively.
Figure 1B:
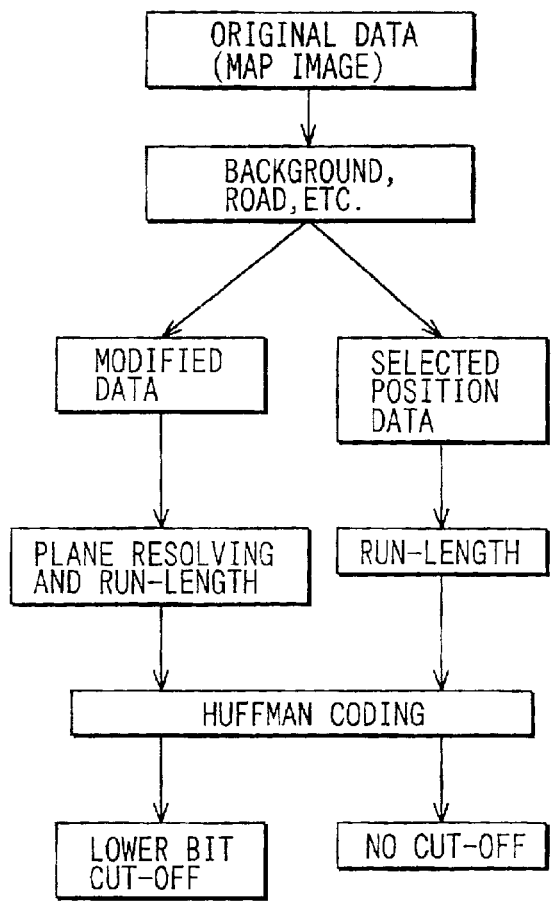

Referring first to FIGS. 1A and 1B, a first image data compressing apparatus is comprised of a color selecting unit 10, a data separating unit 20, and a data compressing unit 30. The apparatus executes an image compressing process operation with respect to input image data having a multi-value.

The color selecting unit 10 selects a color contained in image data which should be compressed, and instructs the selected color to the data separating unit 20. In response to this instructed color, the data separating unit 20 separates image data. As to this color selection process and the data separation process, a map image shown in FIG. 2A is referred to as image data to be compressed.

The color selecting unit 10 selects a color (for instance, cream or pale pink) of a background of this map image. The color of this background may be a color which is used over a relatively large area on a display image. Then, in the data separating unit 20, modified data whose color is similar to a color of a surrounding portion of this selected background portion is produced by a data modifying unit 21. This surrounding color corresponds to a road in the map image of FIG. 2A.

Figure 2A:
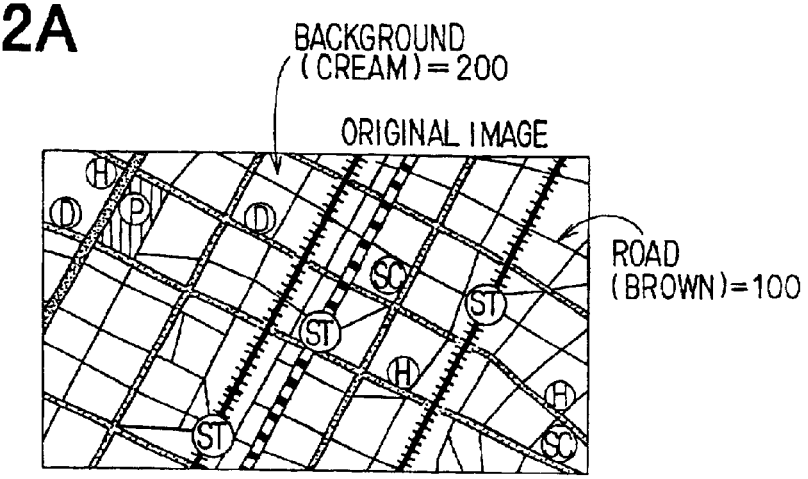
FIG. 2A is an explanatory diagram showing an example of a map image as an original image data.

In FIG. 2A, map image is shown in a simplified manner. That is, hotels, schools, stations, department stores and parks are indicated with alphabetical symbols R, SC, ST, D and P, respectively. Further, the road color (brown) is indicated with dots.

Figure 2B:
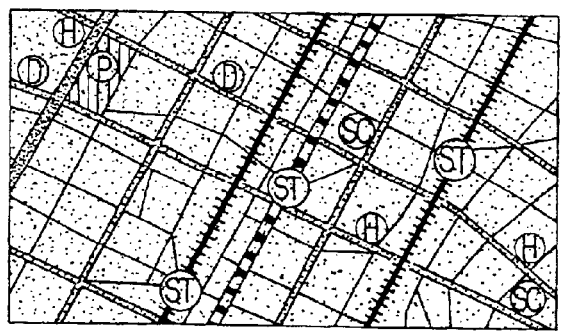
FIG. 2B is an explanatory diagram showing an example of modified data of a background portion which is modified by a brown color equal to a color of a road.

The background portion which is originally in the cream color is modified by using the brown color which is the same as the color of the road. That is, the background portion is modified as shown in FIG. 2B by painting the background of the original image data with the brown color of the road which is a modifying color.

In addition, the data separating unit 20 acquires position data indicative of such a position where the background color is present within the original image data. These modified color data (cream) and the position data (background) are defined as a modified color data (modified data) and a selected color position data (position data), respectively.

Figure 2C:
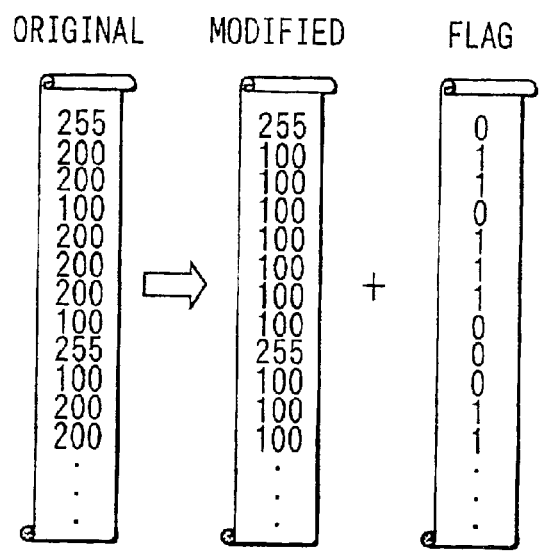
FIG. 2C is an explanatory diagram showing a relationship among a modified color data, a selected position data, and an original image data.

It is so assumed here that a value of the modified color (cream color of the background) is set to 200, and a value of the modifying color (brown of the road) is set to 100. FIG. 2C represents a relationship among the modified color data, the selected position data, and the original image data (original data). It is further assumed that the original image data (original data) is defined with 255→200→200→100→200→200→200→100→, - - -, as an array of color values. Since the value of the selected color (cream) is 200 and the value of color to be modified is 100 of the road color, the color value "200" is replaced with "100" in the modified color data. Thus, the modified color data is defined with an array of the values 255→100→100→100→100→100→100→100→, - - -.

It should be noted that as to the values of these colors, only one value is used to express the relevant color for the sake of brevity. Alternatively, as exemplified in FIG. 3, when these color values are represented by a direct color (RGB), each color may be expressed by a set of three values.

A position which is replaced with 100 is defined as "1" and a position which is not replaced with 100 is defined as "0." Thus, the flag data becomes an array of 0→1→1→0→1→1→1→0→, - - -. This flag data is thus a stream of 1 bit data.

Each of the data, which is separated into the modified color data and the selected position data, is separately compressed by a data compressing unit 30. The data compressing unit 30 has a data converting unit 31, a coding unit 32, and a coding amount control unit 33. Both the modified color data and selected position data are separately data-compressed in a conventional data compressing process.

First, as exemplified in FIG. 3, in the data converting unit 31, RGB data is converted into a luminance (brightness) component (Y) and a color difference component (Cb, Cr). Thereafter, in order that the respective components of Y, Cb, Cr are expressed in multiple precision, these components are resolved into bit planes. Then, the run-length conversion (coding) is carried out in unit of each plane so as to increase deviation of the data. The resultant data is supplied to the coding unit 32. In the coding unit 32, a variable length code is allocated to the supplied data by employing Huffman coding method. Thereafter, in order to make a data amount constant, an amount of produced codes is controlled by the code amount control unit 33. In this code amount control unit 33, the code amount control operation is carried out in such a manner that such bit planes whose importance degrees are low are sequentially cut off, or discarded. As a result, when the bit plane is cut off, the lossy data compression is realized.

As to the selected position data, since this selected position data need not be expressed in the multiple precision as explained in the above modified color data, this selected position data is not resolved into bit planes, but is directly processed by the run-length conversion. The run-length converted data is supplied to the coding unit 32. After a variable length code is allocated to the supplied data in the coding unit 32, the code amount control operation is carried out by the coding amount control unit 33. It should also be noted that no bit plane cut-off process is carried out as to this selected position data. As a result, the lossless data compression is realized.

It should also be noted that the data indicative of the selected color is also required in order to return the color based upon the selected position data. However, since this data may be made of only such data representative of the background color ("200"), its data amount can be neglected, as compared with the data amount to be compressed. As a consequence, this data amount never causes any problem in the case that the entire data compression efficiency is improved.

As described above, in this first embodiment, an arbitrary color is selected from the original image data to be separated into the modified color data and the selected position data, and each data is compressed separately. While the modified color data corresponds to such data that the background portion is modified to be equal to the road color, the selected color of the background corresponds to the color which may be relatively used many times within the map image data. More specifically, in this case, the selected background color is equal to such a color which is most-popularly used.

It can be seen that as to such an image of FIG. 2B in which the color of the background is made equal to the color of the road, the continuity of the same color is considerably increased with respect to the original image data of FIG. 2A. As a result, when the data is run-length-converted by the data converting unit 31, the length of the same data which are continued becomes relatively long. Thus, the data compression efficiency may be improved more relative to a conventional case in which the original image data is not separated. Therefore, even when the selected position data is separately compressed as in the first embodiment, the data compression efficiency may be increased, as compared with a conventional data compression efficiency achieved when the original data is directly compressed.

As a consequence, in this first embodiment, the lower-bit data as to the modified color data may be cut off in the coding amount control unit 33. Considering such a case that the data amount is compressed to be equal to the data amount by the conventional compressing method, even under such a condition that the lower-bit data should be cut off to realize the lossy data compression in the conventional compressing method, there are same possibilities that the lower-bit data is not cut off and the lossless data compression may be realized in accordance with the data compressing method of this embodiment. Otherwise, even when the lower-bit data is cut off, the cut-off data amount is relatively small, which may relatively reduce degradation the image quality.

As to the modified color data, because the data compression is carried out as to each value of the RGB data, the improvement in the data compression ratio may be further attained. Instead of the RGB data, the luminance component and/or the color difference component (Y, Cb, Cr) may be employed.

As to the color selection process, an arbitrary color contained in the original image data may be selected. In the above original map image, the road image other than the background image may be selected. Alternatively, a symbol may be selected. In view of an improvement in an image compression efficiency, it is preferable to select such a color which may cause the spatial frequency of the image to be increased. The color of the road contained in the map image frequently interrupts the continuity of the background color, which may impede that the same data is continued while the run-length conversion is carried out. As a result, this road color may be conceived as an example of "color for causing spatial frequency of image to be increased." Since this color is selected, it is conceivable that the data compression efficiency is relatively improved.

Then, when the color selecting unit 10 selects the color, the following color selection process may be conceived. That is, while the relevant image (map image in this embodiment) is used, the color selecting unit 10 may select such a color which is instructed from an external device for executing a pre-selected application software process operation. Alternatively, such a color selection may be automatically effected by the color selecting unit 10. For example, while colors contained in an original data are selected one by one, the selected color is frequency-converted under such a condition that this selected color is modified by using a color surrounding this selected color, a degree at which a spatial frequency is reduced is detected. Thus, such a color which owns a maximum reducing degree is selected.

(Second Embodiment)

Figure 4A:
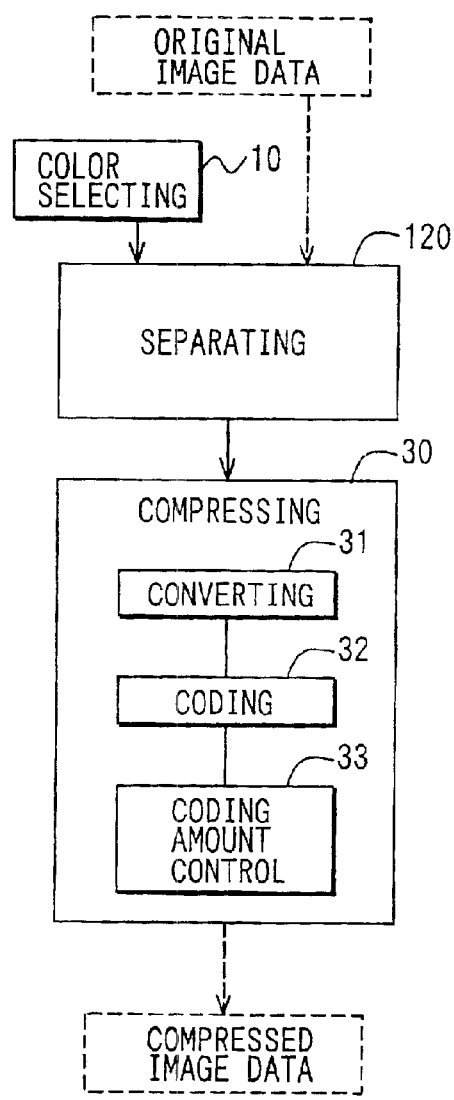
FIG. 4A is a block diagram schematically showing an arrangement of an image data compressing apparatus according to a second embodiment of the present invention.

In a second embodiment, as shown in FIG. 4A, a data compressing apparatus is constructed similar to the first embodiment. Only a data separating unit 120 is different from the data separating unit 20 of the first embodiment. That is, the data separating unit 120 has no modifying unit 21 therein, and hence no data modification operation is carried out. Instead, a data thinning-process operation is performed to reduce the number of data.

Figure 4B:
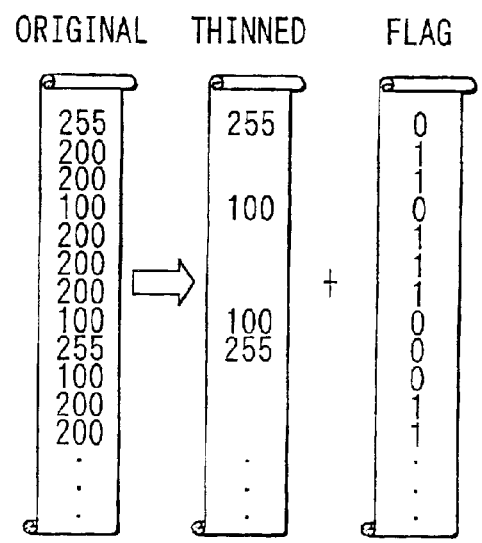
FIG. 4B is an explanatory diagram showing a relationship among a remaining data, a selected position data, and an original image data.

Instead of the modified color data shown in FIG. 2C of the first embodiment, a remaining data is produced as shown in FIG. 4B. It is assumed that the original data is comprised of an array of color values, i.e., 255→200→200→100→200→200→200→100→ - - - in the same manner as in the first embodiment. Since the value of the selected color is "200" of the background color, this value of 200 is extracted from this color value array. Thus, the remaining data becomes an array of values, i.e., 255→100→100→255→100→ - - - . A resulting content of the data-compressed image data after the original data has been separated is made similar to that of the first embodiment.

Since the data separation is performed in the second embodiment as in the first embodiment, the entire data compression efficiency can be improved similarly as in the first embodiment. In the case of the modified color data (first embodiment), the data size of this modified color data is not changed from the data size of the original data, but the data can be processed in a parallel mode when the data is expanded. To the contrary, in the case of the remaining data (second embodiment), the data size of this remaining data becomes relatively smaller than the modified color data of the first embodiment. However, inserting or embedding operation is required in order to sequentially insert the remaining data in accordance with the position data. When the data is expanded, since the data should be processed in a serial manner, it is likely that that the data processing operation would require a longer period. If this lengthy data processing time does not cause any practical problem, then the data compression efficiency may be further improved in the second embodiment due to the reduction of the data size of the remaining data.

The above image data compressing apparatus of the first and second embodiments may be implemented by way of various modified modes.

(1) For instance, although the selected color is only one color in the first and second embodiments, a plurality of colors may be selected. In this alternative case, as to the selected position data which is shown as the 1-bit data stream in FIG. 2C and FIG. 4B, "n" sets of flag data may be prepared when "n" pieces of colors are selected.

Alternatively, the following color selection may be carried out. That is, a selected position data is formed which indicates each position where n-bit ($2^n-1$) colors are present. For example, if three colors of red (R), green (G) and blue (B) are selected, these three colors may be represented by 2 bits. It is assumed that symbol "00" indicates such a state where none of three colors is selected; symbol "01" indicates the red color; symbol "10" shows the green color; and symbol "11" represents the blue color. When this modification is introduced, if a single selected position data constituted by an n-bit data stream is prepared, then the image data compressing apparatus may be applied to ($2^n-1$) colors. As a consequence, it is likely that the data compression ratio can be further improved while the data amount of the selected position data itself is relatively reduced. However it should be noted that when each color is indicated by 1 bit, "n" colors requires "n" bits. Since the data compression ratio in the position data corresponding to each of "n" colors is increased, it is likely that the total compression ratio may be increased.

(2) With respect to the colors used in the modification, when the number of selected colors is "n," the modification colors may be separately set to the respective selected colors. Alternatively, only one modification color may be commonly used in any of these selected colors. For instance, the color of the background is modified by employing the color of the road. Alternatively, while two colors of both the background and the symbol are selected, both colors may be modified by using the road color.

(3) In the above embodiments, the data compressing unit 33 sequentially and separately compresses both data. Alternatively, two sets of the data converting unit 31, the coding unit 32, and the coding amount control unit 33 may be provided, so that the data may be processed in a parallel manner as opposed to the serial process. If no real-time operation is especially required for the data compression itself, only one set of the above data compression arrangement will suffice.

(4) The image data need not be a map image, but may be any type of images. It should be understood that when the map image is used, the road is considered to be the portion which may cause an increase in the spatial frequency, and also the color of the background portion is considered to be the color which is relatively used many times. As a consequence, the image data compressing method of the above embodiments may be effectively applied in which the color data are separately compressed. In a case that the map image is compressed, both the background color and the road color may be merely designated from an external device outside the image data compressing apparatus. When the color selecting unit 10 is so arranged as to automatically determine the proper color, this compressing apparatus may be effectively applied to any images.

(5) When the modified data or the remaining data is subjected to a data conversion by the data conversion unit 31, DCT (discrete cosine transform) may be employed in place of the run-length conversion. Further the data compressing unit 30 may be constructed to compress data by LZ method.

(Third Embodiment)

Figure 5:
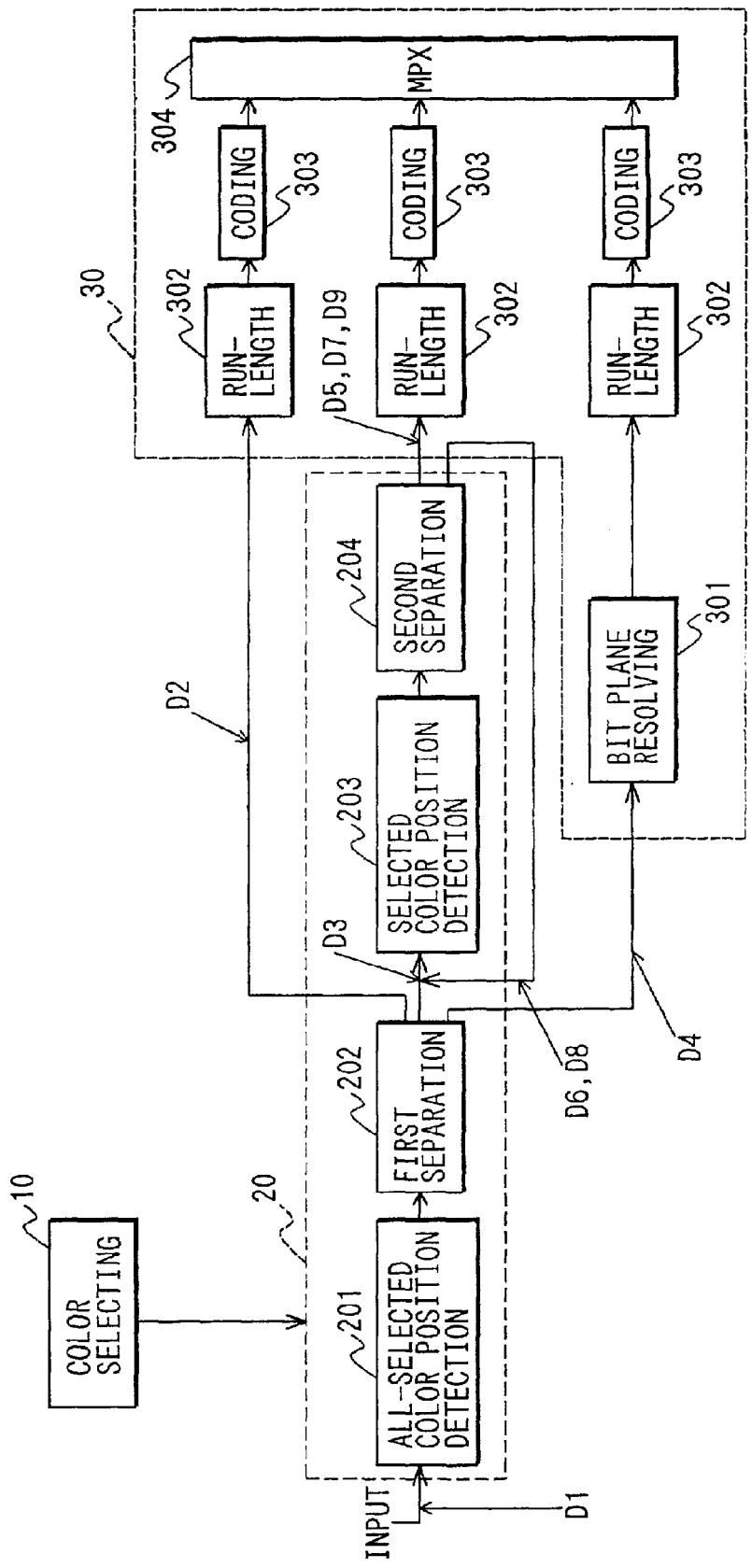
FIG. 5 is a block diagram schematically showing an arrangement of an image data compressing apparatus according to a third embodiment of the present invention.

A third embodiment is directed to improve the image data compressing apparatus of the first and the second embodiments. As shown in FIG. 5, an image data compressing apparatus has a color selecting unit 10, a data separating unit 20, and a data compressing unit 30. This image compressing apparatus is also for executing a data compressing process operation with respect to input original image data having a multiple value.

The color selecting unit 10 selects a color contained in the original image data which is to be compressed, and then instructs the selected color to the data separating unit 20. In response to this selection of color, the data separating unit 20 separates the image data. As to the color selection process by the color selecting unit 10, any colors in the original image data may be selected. For instance, in the case that a map image is employed as the original image data, a color of a road on this map image may be selected. Also, while this original image data is employed, such a color may be selected which is instructed from an external device capable of executing a pre-selected application software process operation. For example, when the original image data is the map image, the color selection process may be made in response to an instruction issued from a navigation system.

Figure 8:
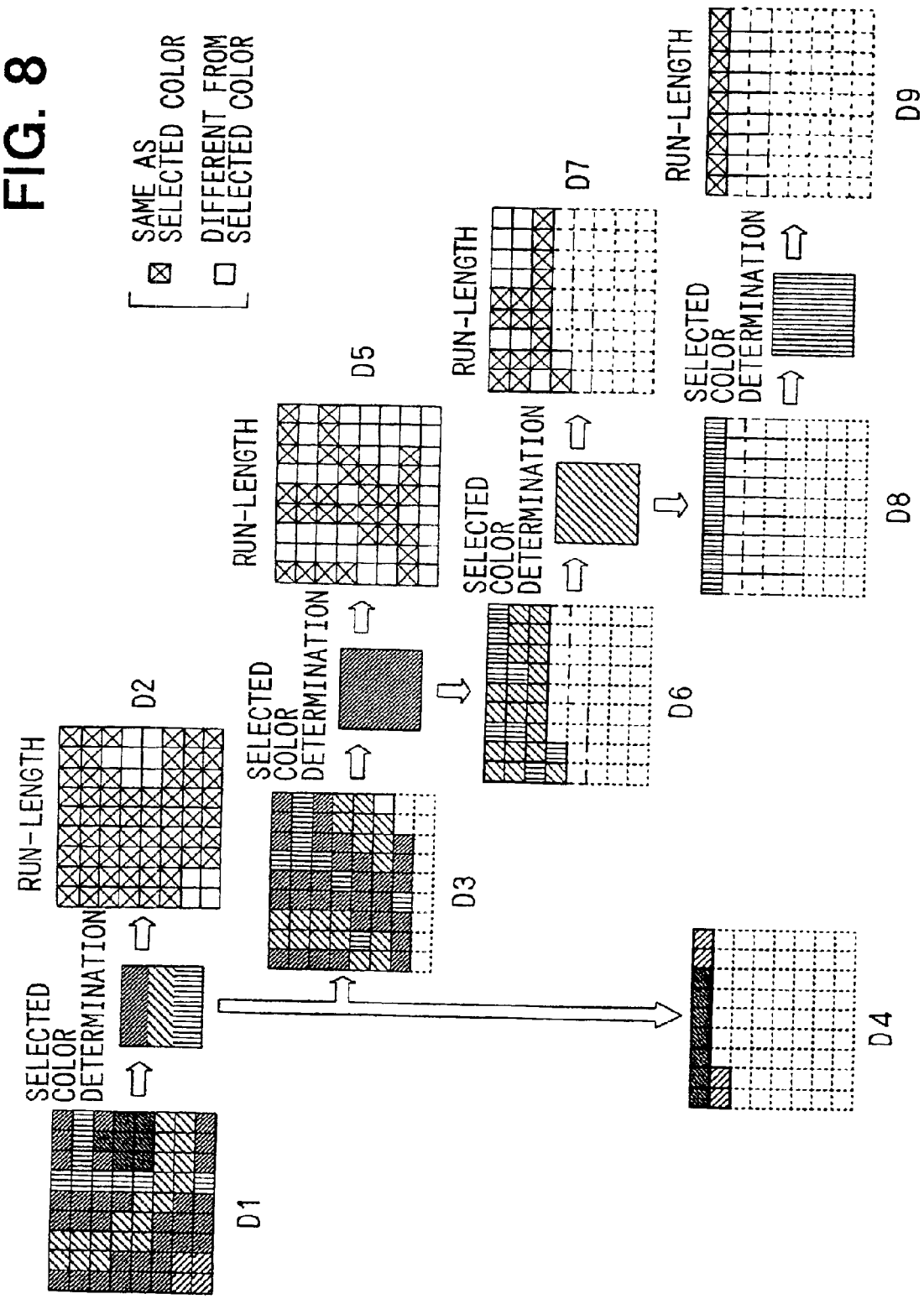
FIG. 8 is an explanatory diagram showing a data separation method according to the third embodiment.
Figure 9:
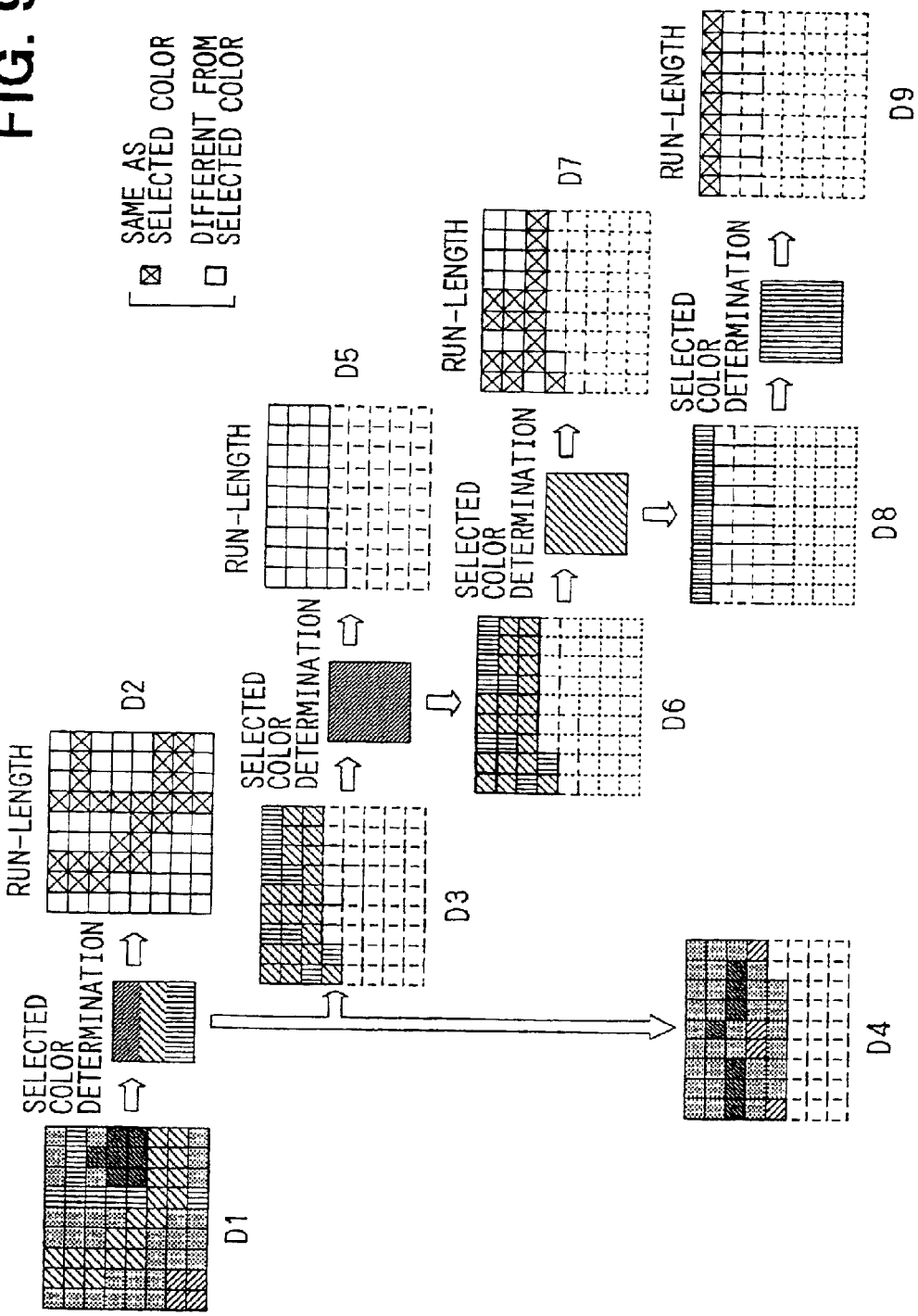
FIG. 9 is an explanatory diagram showing a data separation method according to the third embodiment.

Data separation method in this embodiment will be explained with reference to FIG. 5, FIG. 8 and FIG. 9 in comparison with one method (FIG. 6 and FIG. 7) proposed previously in Japanese patent application No.2000-130177 by the same assignee as the present application, assuming that three colors are set as selected colors. Specifically, FIG. 8 shows a data separation condition in the case that there is a small amount of remaining data, and FIG. 9 shows a data separation condition in the case that there is a large amount of remaining data.

In FIG. 5, with respect to input original image data D1 having a multiple value, an all-selected color position detection block 201 employed in the data separating unit 20 detects that the three selected colors are located on which places of the input image data, and then produces all-position data D2. Furthermore, a first separation block 202 separates this all position data D2 into data made of only the selected colors (position data D3), and image data obtained by extracting the position data D3 from the input image data D1, that is, remaining data D4.

At this stage, this all-position data D2 is sent to the data compressing unit 30 to be processed by the 2-value run-length converting operation. Thereafter, the converted data is coded (that is, code is allocated from code table). Also, at this stage, the remaining data D4 is also sent to the data compressing unit 30. This remaining data D4 is firstly resolved into bit planes in a block 301, and thereafter, this bit plane is processed by the 2-value run-length converting operation in a block 302, and the converted data is coded in a block 303.

On the other hand, as to the position data D3, a selected color position detection block 203 of the data separating unit 20 firstly determines such a selected color having the set highest priority order. A second separation block 204 separates the position data into first position data D5 and selected color remaining data D6. This first position data D5 indicates such a position where this selected color (that is, selected color having highest priority degree) is present within the position-data D3. This selected color remaining data D6 is produced by extracting this selected color (that is, such a selected color having highest priority order) from the position data D3. Thus, the selected color remaining data D6 which has been produced by being separated in this manner is sent to the selected color position detection block 203.

This selected color position detection block 203 determines such a selected color having the next highest priority order. The second separation block 203 separates the selected color remaining data into second position data D7 and selected color remaining data DB. This second position data D7 indicates such a position where this selected color (that is, selected color having second highest priority degree) is present within the position data D3. This selected color remaining data D8 is produced by extracting this selected color (that is, such a selected color having next highest priority order) from the data D6.

A series of the above operations is repeatedly carried out plural times which are equal to a total number of selected colors. The position data (that is, first, second, third position data D5, D7, D9) corresponding to the three selected colors are separated from the input image data D1. These position data are sequentially sent to the data compressing unit 30 so as to be processed by the run-length conversion and the coding operation in respective blocks 302 and 303. The outputs of the coding blocks 303 are sent to a multiplexing block 304 to be multiplexed.

In accordance with the image data compressing apparatus of this third embodiment, when the image data having the multiple value is compressed, since this image data is separated from the remaining data D4 and the position data D5, D9 and all-position data D2, the following advantages can be achieved.

The remaining data D4 corresponds to such data obtained by thinning-processing an image of a selected color. For instance, in the case that a map image is considered, when several sorts of roads are shown by using a plurality of colors, these colors of the roads frequently interrupt a continuity of a background color. This may impede that the same data are continued when this data is processed by, for example, the run-length converting operation. In contrast thereto, when the data of this road portion is extracted from the remaining data, the continuity of the background color can be improved. Then, when this thinning-processed road data is converted by the run-length converting operation, it is highly likely that the same data are continued. As a consequence, when the remaining data D4 is compressed from which the selected color portion is extracted in this manner, the data compression ratio can be relatively improved.

Further, the larger the roads contained in the map data are increased, the higher the compression efficiency of the remaining data may be conversely increased. As a consequence, even in a case that the position data D5, D7, D9 and all-position data D2 are separately compressed which indicate such positions of the image, where the portions of the selected colors are present, it is highly likely that the entire data compression efficiency can be improved, as compared with the data compression efficiency obtained when the original image data is directly compressed.

It should also be noted that since the position data D2, D5, D7 and D9 cannot be compressed in the lossy manner, these position data are compressed in the lossless manner. As a consequence, when the colors which are selected based upon these position data D5, D7, D9 and all-color selected position data D2 are returned, the selected colors become lossless, and can contribute the image quality without changing the colors. In order to restore the colors, the data indicative of the selected colors are also required. If the data amount of this data is compared with the data amount to be compressed, then this data amount may be negligible. As a result, this necessary data does not cause a substantial problem when the entire compression efficiency is improved.

Figure 6:
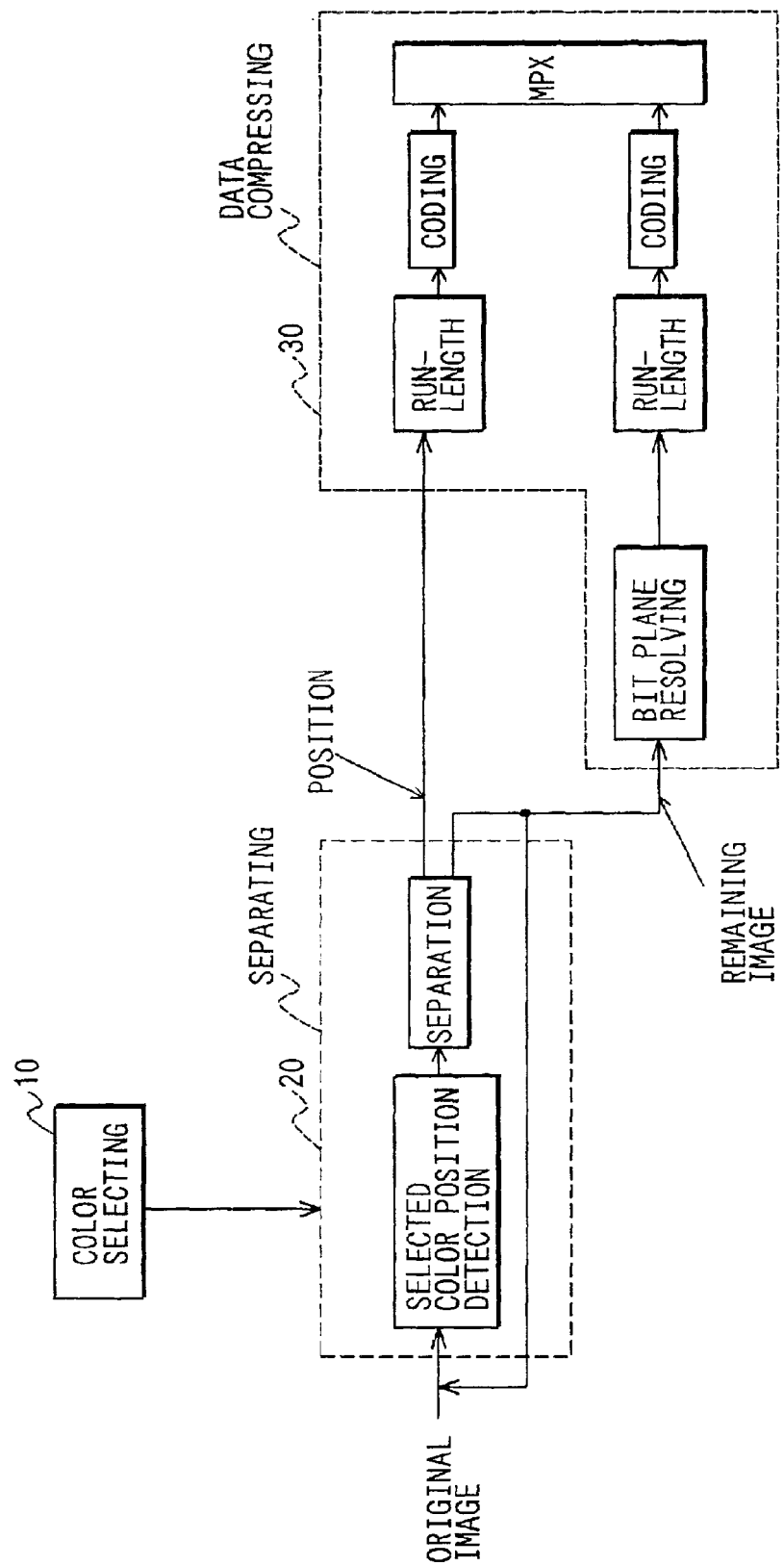
FIG. 6 is a block diagram schematically showing an arrangement of an image data compressing apparatus as a comparative example.
Figure 7:
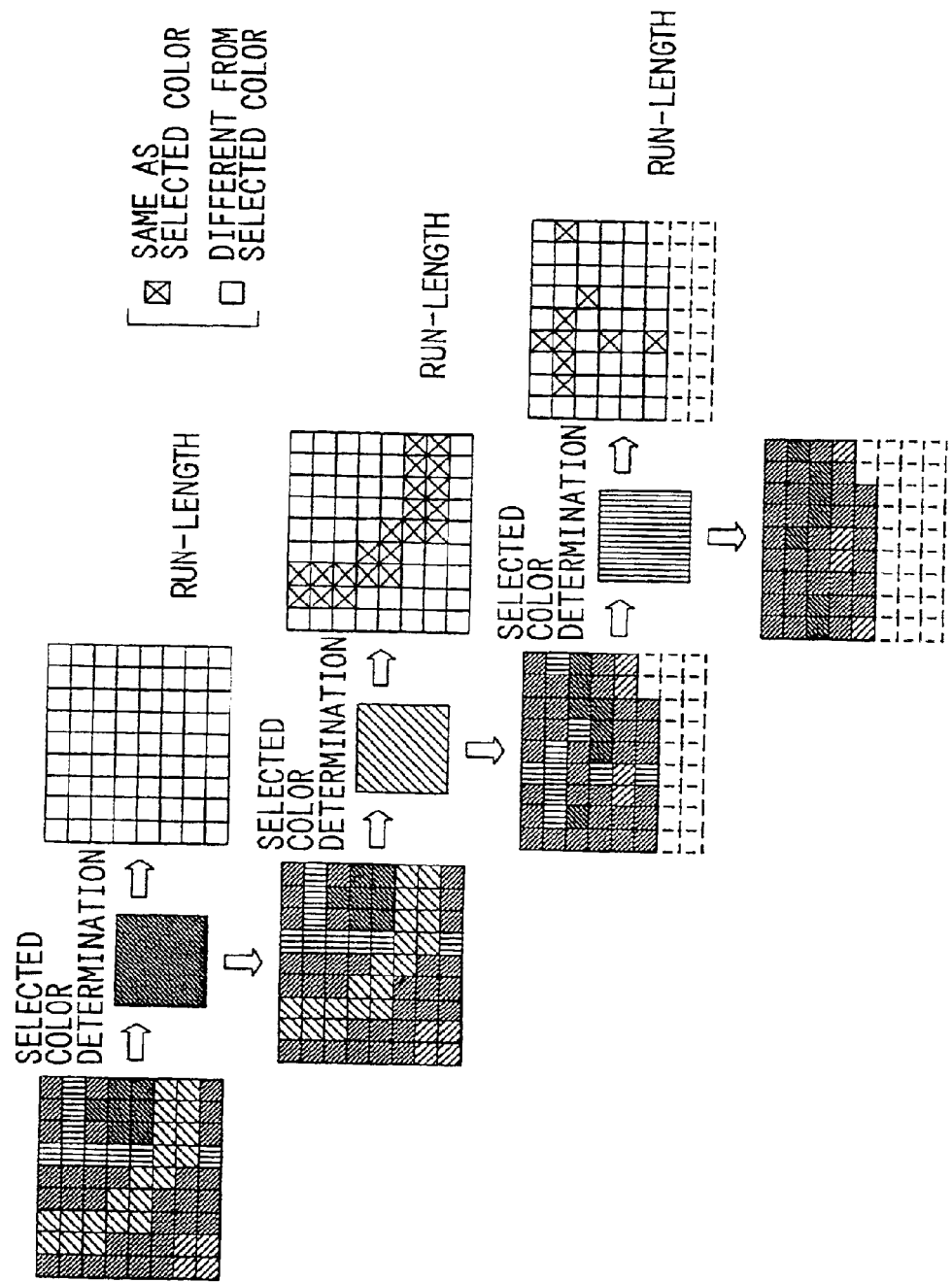
FIG. 7 is an explanatory diagram showing a data separation method executed in the comparative example.

This advantage may also be achieved even in the proposed comparative method shown in FIG. 6 and FIG. 7. However, the third embodiment can achieve the following additional advantages over those of the comparative method of FIG. 6 and FIG. 7.

Specifically, when the proposed comparative data compressing method is carried out, in a case that one certain color is extracted from input image data and the input image data is separated into both position data and remaining data, such redundant information, that is a non-selected color, is contained in this position data. Similarly, in a case that one certain color is extracted from the remaining data and the remaining data is separated into both position data and remaining data, such redundant information, that is a non-selected color, is contained in this position data.

While observing a determination result of the selected colors shown in FIG. 7, it can be seen that the data about the non-selected colors are contained in any determination result. This may increase the redundant characteristic and also the coding amount. This is caused by the following reason. That is, in this compressing method, a plurality of colors are sequentially separated. When the final color is separated, the remaining data is finally produced.

To the contrary, in accordance with this third embodiment, as shown in FIG. 8, since the final remaining data D4 is produced in the initial stage, the redundant characteristic related to the non-position data contained in the position data D3 is reduced. In other words, since such data related to the to finally selected color (that is, remaining data D4) is not present in the position data D3, the redundant characteristic is lowered, so that the data compression effect can be increased. Also, there is another advantage that the run-lengths of the position data D5, D7, D9 of the respective selected colors after the separation can become long. Therefore, the improvement in the data compression effect can be furthermore expected.

In the third embodiment, all of the position data which are produced in correspondence with the three selected colors are coded. Alternatively, since only the selected color is present in the selected color image data D3, the position data D9 of the selected color whose priority order is minimum need not be coded.

This reason is given as follows. In accordance with the above data compressing method, the color having the top priority order is extracted from the selected color image data D3 so as to produce both the first position data D5 and the selected color remaining data D6. With respect to this selected color remaining data D6, the color having the second top priority order is extracted so as to produce both the second position data D7 and the selected color remaining data D8. This second position data D7 indicates the relative position of the relevant selected color contained in the two remaining colors.

Assuming now that the extracting operation of the selected color is repeatedly performed until the determination of the selected color having the second lowest priority order, only two image data are merely contained in the selected color remaining data D6 in this case. That is, the selected color remaining data having the second lowest priority order and the selected color image data having the lowest priority order are merely contained in this selected color remaining data D6. That is, in the determination of this stage, the determined color having the lowest priority order is present at such a position where the selected color having the second lowest priority order is not present. As a consequence, even when the position data with respect to the selected color having the lowest priority order is not determined, the position thereof can be specified.

It should also be noted that when the position data having lowest priority degree is also coded, the work load of the data processing operation is relatively increased. However, in this case, the following advantage may be achieved. That is, as to the position data having the lowest priority order, the same data are necessarily continued. For instance, when the selected color is expressed as "1", all of the data must be "1."As a result, in a case that the same data are not continued, it is likely that a certain erroneous process operation is carried out. Such an erroneous process determination can be carried out.

Also, in a case that the run-length process operation executed in the data compressing unit 30 is realized by employing hardware, this run-length is limited to the bit width of the counter employed in this data compressing unit 30. Therefore, in this third embodiment, when the run-length exceeds the bit width, a code that the run-length is equal to "0" is inserted. For instance, in such a hardware that the run-length is counted by an 8-bit counter, when the actual run-length is equal to 260, 255, 0, and 15 are outputted.

Since the run-length of "0" is inserted, the code may be allocated to such a run-length which exceeds the limitation of the bit width. For instance, in a case that a run-length of a value "1" within 2-values of "1" and "0" is equal to 260, if simply 255 and 5 are expressed, then there is no clear definition that the latter value of "5" indicates either the run-length of "1" or the run-length of "0." Since the run-length of "0" is inserted, it can be cleared that the run-length 1 of 255→the run-length 0 of 0→the run-length 1 of 5. As a result, it is so cleared that the run-length indicates "1" of 260. As a consequence, even the 8-bit counter can indicate the run-lengths larger than, or equal to 256. Apparently, if the bit width of the internal counter is set to a large bit width, then the above difficulty can be solved.

In such a rare case that the run-length becomes very long, the unnecessary large bit width is provided, which may increase the unnecessary circuit scale and the unwanted high cost. To avoid this problem, the above technical solution may become effective.

Figure 10:
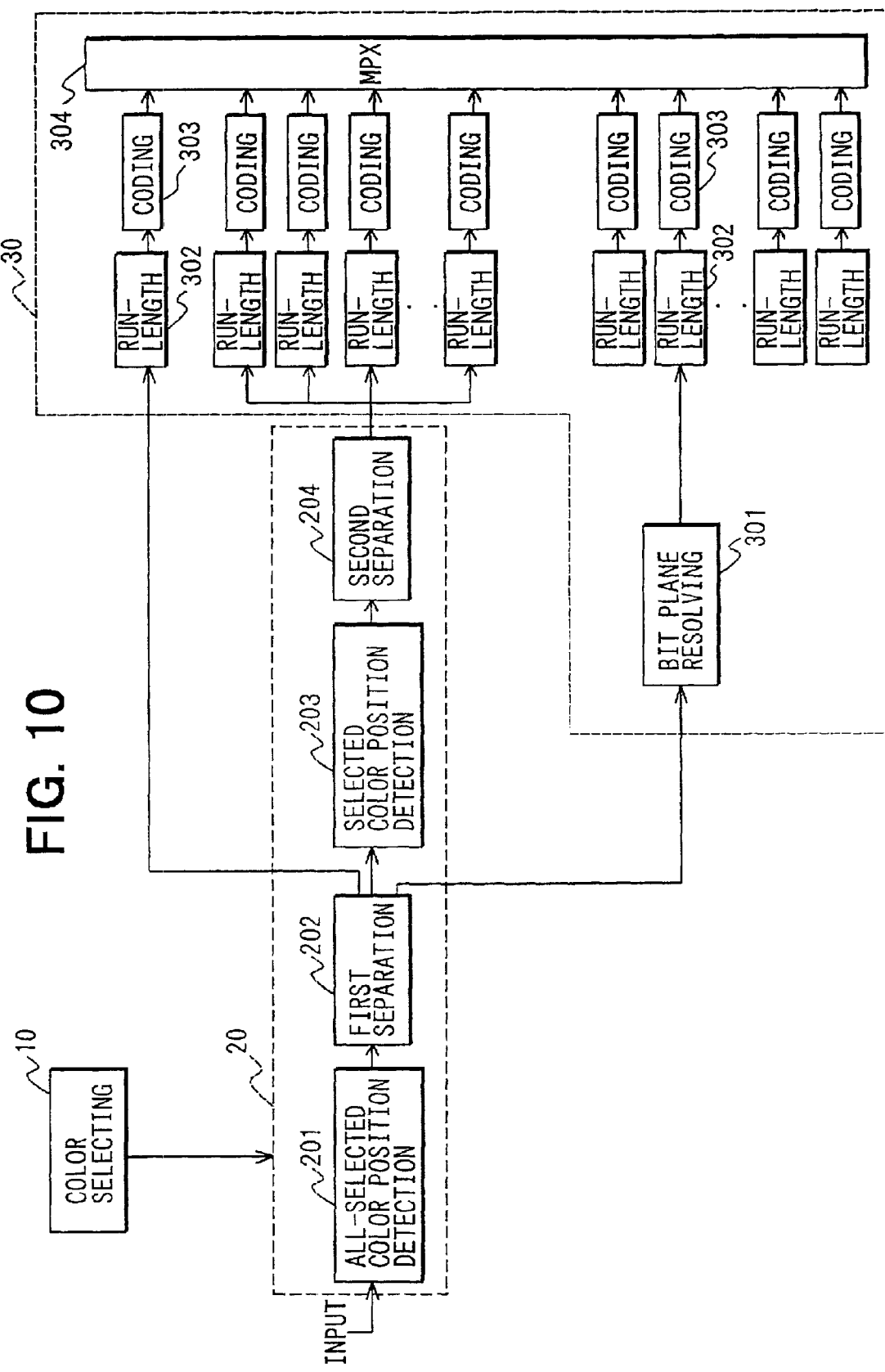
FIG. 10 is a block diagram showing an arrangement of an image data compressing apparatus according to the third embodiment in which a run-length conversion and a coding operation are preformed in a parallel.

When the run-length process operation is realized by using hardware, as shown in FIG. 10, the data compressing unit 30 may be arranged in such a manner that the position data as to a plurality of colors which are obtained by the separation are processed in a parallel manner in order that the position detection of the selected colors and the second data separation by the data separating unit 20 can be carried out within one cycle. Similarly, after the remaining data D4 have been resolved in the unit of bit plane, the data every plane may be processed in parallel.

(Fourth Embodiment)

Figure 11A:
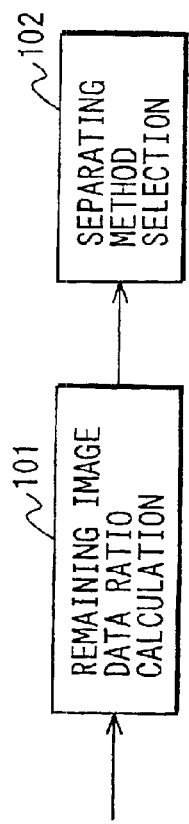
FIG. 11A is a block diagram schematically showing an arrangement of an image data compressing apparatus according to a fourth embodiment of the present invention.

In a fourth embodiment shown in FIG. 11A, a calculation is made of a ratio of remaining data to an original image data with respect to input image data in a calculation block 101, and a selection is made of any one of the methods of the third embodiment of FIG. 5 and the proposed comparative method of FIG. 6 in a selection block 102. Then, this image data compressing method employs such a data separating method in accordance with this selected method.

This embodiment is made by considering the following points. That is, in the proposed comparative method (FIG. 6 and FIG. 7), a total number of position data is equal to the total number of selected colors. In the method of the third embodiment (FIG. 5, FIG. 8 and FIG. 9), the all-position data D2 which is produced in the initial stage is present in addition to the position data (first, second, third position data D5, D7, D9) corresponding to the respective selected colors. As a result, in the case that the ratio of the final remaining data to the original image data is relatively large, the method of the third embodiment becomes effective. However, in the case that the ratio of the final remaining data to the original image data is relatively small, the proposed comparative method becomes effective.

Therefore, this image data compressing apparatus in the fourth embodiment determines as to which one of the methods of the third embodiment and the proposed comparative one is effective, and then employs the determined method. The effectiveness of these two methods may be compared with each other based upon a process coefficient obtained by separating the input image data into the all-position data D2 and position data D3, and the remaining data D4 in the initial stage. Further, the effectiveness may be compared based upon another process coefficient obtained by allowing the redundant characteristic of the remaining data and by sequentially producing the position data of the selected colors. That is, a ratio of the non-selected color (remaining data) with respect to the input image data, which is calculated from a relationship between the process coefficients of the above two methods, is employed.

Figure 11B:
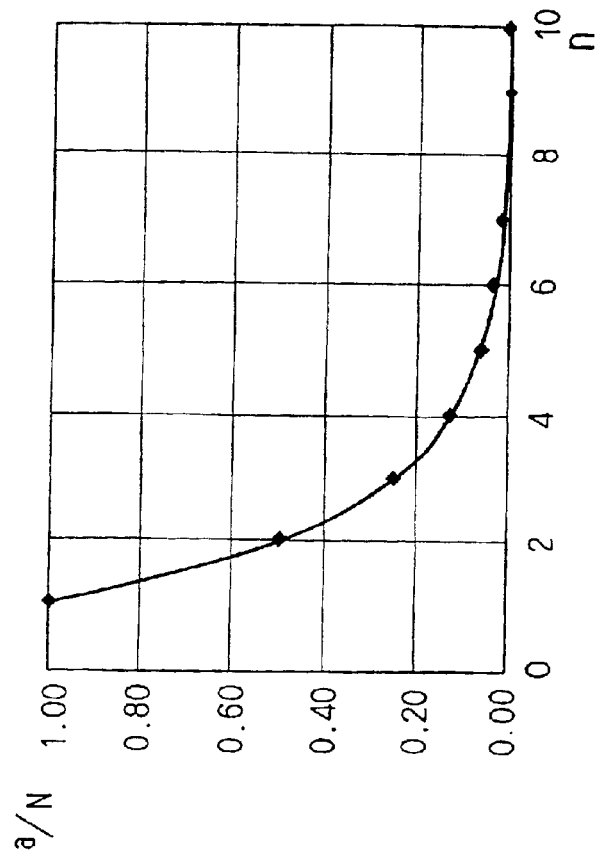
FIG. 11B is an explanatory diagram showing a separation method selecting curve.

FIG. 11B represents a threshold value curve thereof. This threshold value curve corresponds to such a curve that when a total pixel number is "N", a selected color number is "n", and a remaining pixel number is "a", a ratio of the remaining pixel number a/N=1/n. The ratio (a/N) becomes more than and less than the threshold value curve when the method of the third embodiment and the proposed comparative method are employed, respectively, as shown in FIG. 11B.

The remaining data ratio calculating block 101 scans the input original image data so as to calculate a ratio of the remaining data to the original image data. In the separating method selection block 102, when the calculated ratio is above the threshold value curve, there are many remaining data. The input image data is separated by way of the method of the third embodiment. Since it is effective to separately compress the image data, this method is selected. On the other hand, when the calculated ratio is located below the threshold value curve, it is effective to compress the image data by way of the proposed comparative method. Although the all-position data is not produced, this method is selected. Since the separating methods are thus switched in a proper manner, the data compression suitable for the input image can be realized.

(Fifth Embodiment)

Figure 12:
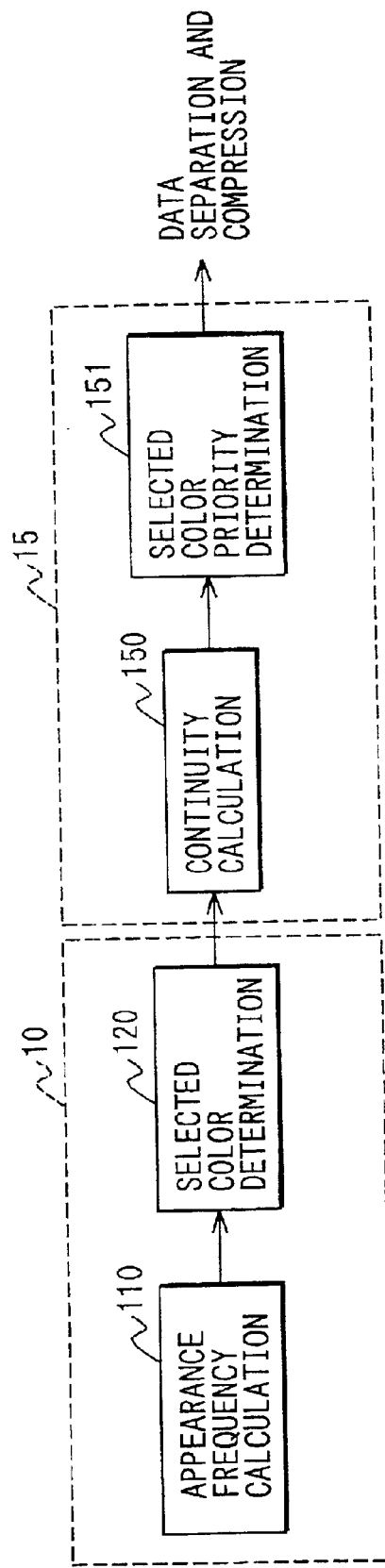
FIG. 12 is a block diagram schematically showing an arrangement of an image data compressing apparatus according to a fifth embodiment of the present invention.

A fifth embodiment shown in FIG. 12 is directed to an improvement of the second, third and fourth embodiments. It is noted in the above third embodiment, as to the color selection process by the color selecting unit 10, if an arbitrary color of an original image data is present, then this arbitrary color may be selected. Also, it is conceivable to select such a color which is selectively instructed by the external device capable of executing a predetermined application program process operation by employing an original image data. However, the selection color may be determined based upon a feature of an image to be entered. Also, as to the sequential order at which the second separation is carried out with respect to the position data D3 obtained by the first separation, the selected color may be preferably determined based upon the feature of the input image.

Therefore, as shown in FIG. 12, in the color selecting unit 10, an appearance frequency degree of color data of interest is calculated in a block 110, and then a selected color is determined in a block 120 based upon this calculated appearance frequency degree. Then, a priority degree determining unit 15 calculates a continuity of the color data in a block 150, and then determines a priority degree of the selected color based upon this calculated continuity. While these determined results are employed, both the data separating process and the data compressing process of either one of the second, third and fourth embodiments are carried out.

Figure 13:
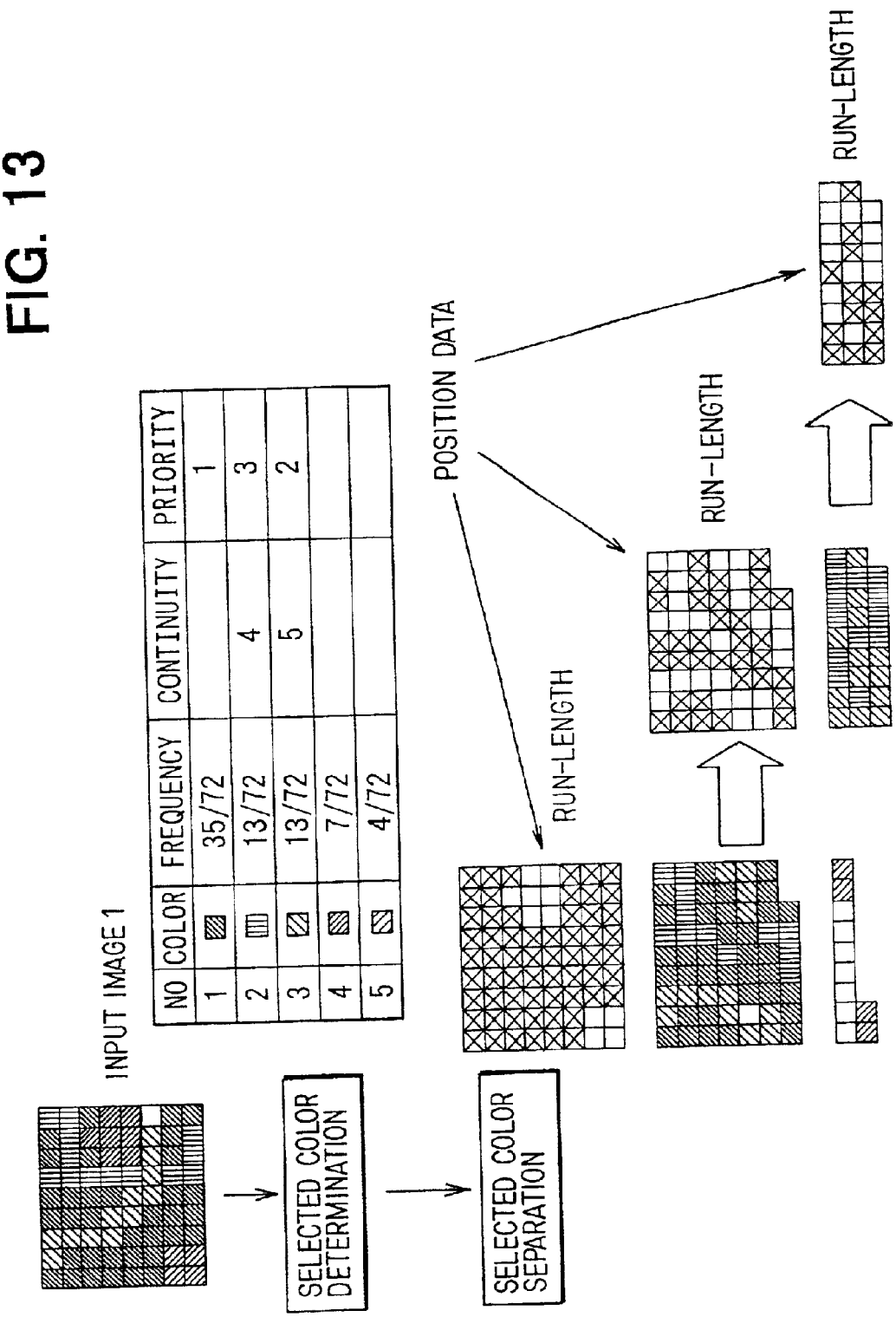
FIG. 13 is an explanatory diagram showing a method for determining both a selected color and a priority order in the fifth embodiment.

For example, as shown in FIG. 13, it is assumed that image data is represented in 5 colors (color numbers 1 to 5), and the number of selected colors is 3. The selected colors may be determined based upon both appearance frequency degrees and continuities of data along a scanning direction. In the run-length process operation, the position data must be produced in such a manner that the run-length is made longer as being permitted as possible in order to reduce entropy. There is a great possibility that as to such a color having a high appearance degree, the run-length thereof becomes long. As a result, the selected color is firstly determined from such colors whose appearance frequency degrees are high. The input image data D1 is scanned along the raster direction to calculate appearance frequency degrees of the respective colors. In FIG. 13, the colors numbered 1, 2 and 3 are selected.

In the case that the appearance frequency degrees are equal to each other, in order to prolong the run-length by the data separation, a priority degree of such a color whose continuity along the scanning direction is high is increased. In FIG. 13, while the appearance frequency degrees of the color numbers 2 and 3 are equal to each other, the continuity of the color number 3 along the raster direction is higher than the remaining color numbers. As a consequence, the selected colors are set in this order of color number 1→color number 3→color number 2, that is, in higher order of the priority degrees. Since the selected colors are determined in this manner, the respective separated position data can be converted into the data having the high continuities, and the data can be compressed in such a higher efficiency.

It should be noted that this determination of these selected colors may be updated only during the first frame of the input image data, or may be updated every frame. For example, in a case that basic elements constituting an image, e.g., a background and a road of a map image are fixed to some extent, this determination of the selected colors may be updated only during the first frame, which will not cause any problem.

The above, third, fourth and fifth embodiments may be modified as follows.

(1) Since the image data compressing apparatus is directed to a selection of plural colors, "n" sets of flag data may be prepared when "n" pieces of colors are selected, that is "n" is equal to a total number of selected colors. Also, such a selected position data is formed which indicates each position where n-bit ($2^n-1$) colors are present. For example, in such an assumed case that three colors of red, green and blue are selected, these three colors may be represented by 2 bits. That is, "00" indicates such a state where none of three colors is selected, "01" indicates the red color, "10" shows the green color, and "11" represents the blue color. When this modification is employed, if a single selected position data constituted by an n-bit data stream is prepared, then the image data compressing apparatus may be applied to ($2^n-1$) colors. As a consequence, it is likely that the data amount of the selected position data itself is relatively reduced, and the data compression ratio can be further improved while.

(2) Also, as the image data which should be compressed, the map image is employed. However, the present invention is not limited to this map image.

(3) With respect to the code allocation, there will be a case that as to either the all-position data D2 and the remaining data D4, which are separated by the first separation block, or the respective position data D5, D7, D9, which are separated by the second separation block, data to be processed are identical to each other. In this instance, if a code indicative of this state is previously determined, then the coding amounts with respect to the different data sizes of the respective selected colors can be reduced while the run-length process operation is carried out for, e.g., the position data. For instance, the position data D5 indicated in FIG. 9 corresponds to such a result obtained by determining the selected color with respect to the selected color D3. In this case, since all of the data are not coincident with the selected color, all of these data are identical to each other. Not only such position data, but also the remaining data D4 are resolved by way of the bit plane and also the 2-value run-length process operation. To this end, similar to the position data, there are some possibilities that the remaining data D4 owns the same information in the unit of the bit plane. As a consequence, if the process subject is set to the bit plane unit, it is likely that all of the data contained in this process subject may become identical to each other. Accordingly, this method may be applied also to the remaining data D4.

(Sixth Embodiment)

Figure 14A:
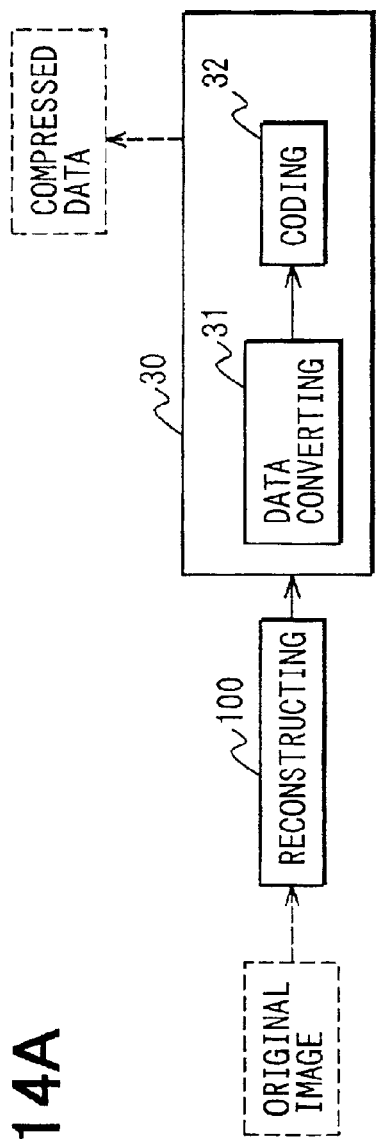
FIG. 14 is a block diagram schematically showing an arrangement of an image data compressing apparatus according to a sixth embodiment of the present invention.
Figure 14B:
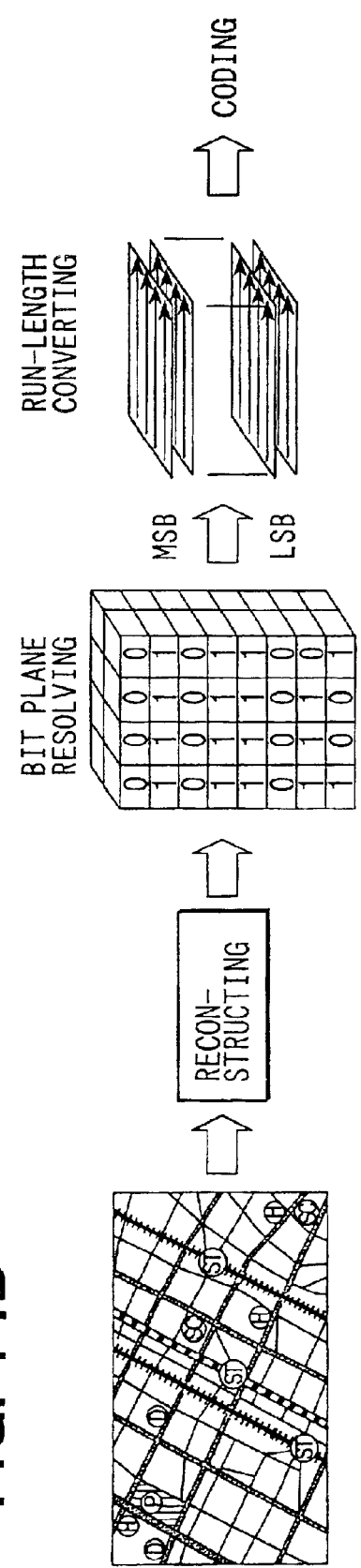
Figure 15A:
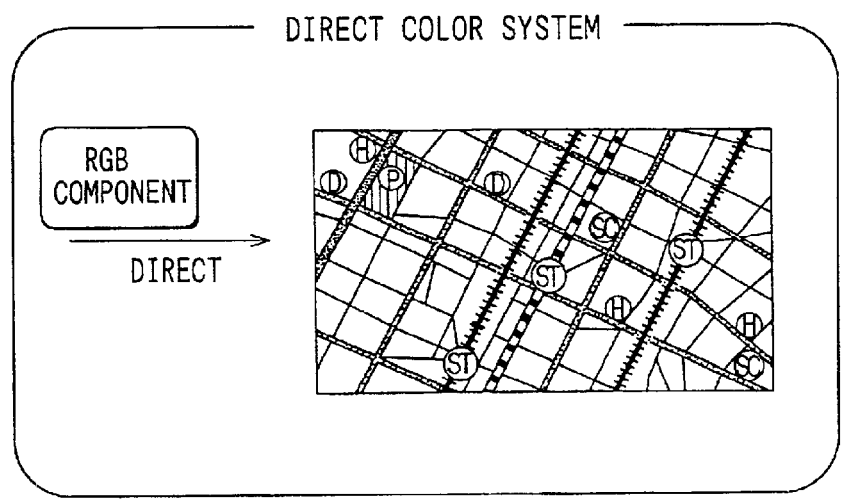
FIG. 15A and FIG. 15B are explanatory diagrams showing a direct color system and a color palette system, respectively.
Figure 15B:
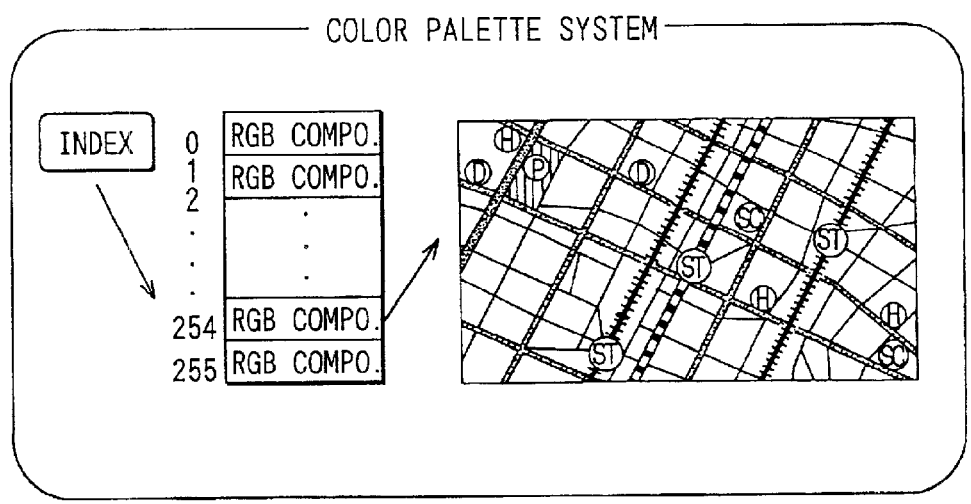

In a sixth embodiment, as shown in FIG. 14A and FIG. 14B, an image data compressing apparatus has a reconstructing unit 100 and a data compressing unit 30 to execute a compressing process operation with respect to input original image data having a multiple value (multi-value). This image data corresponds to an image before being compressed. The original image data which should be processed (data-compressed) is represented by the color palette system. While such decimal values as "0" to "255" are used as this index, 256 sorts of colors are allocated as shown in FIG. 15B as opposed to a direct color system shown in FIG. 15A. The data compressing unit 30 may be constructed in the similar manner as in the foregoing embodiments.

First, the operation of the data compressing unit 30 will now be simply explained. This data compressing unit 30 has the data converting unit 31 and the coding unit 32. In this data converting unit 31, the index is resolved into bit planes, and the 2-value run-length converting operation is carried out in the unit of each bit plane so as to increase deviation of the data. Then, the processed data is supplied to the coding unit 32. In this coding unit 32, a variable length code such as the Huffman code is allocated. Different from the compressing method executed in the normal direct color image, the data compression should be carried out in the lossless manner. Therefore, the coding amount is not controlled after being coded, and no coding amount control unit is necessitated.

Figure 16A:
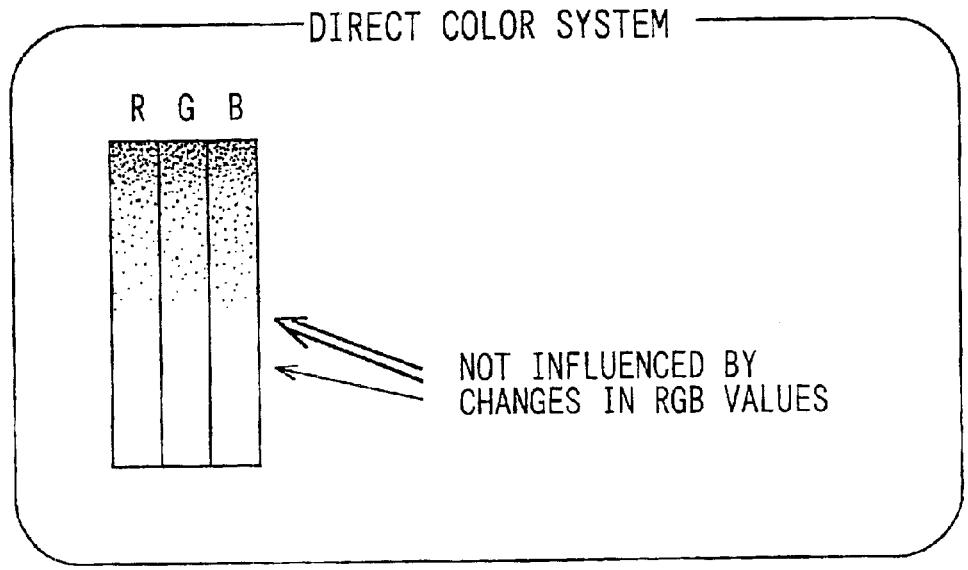
FIG. 16A and FIG. 16B are explanatory diagrams showing a lossy compression of the direct color system and a lossy compression of the color palette system, respectively.
Figure 16B:
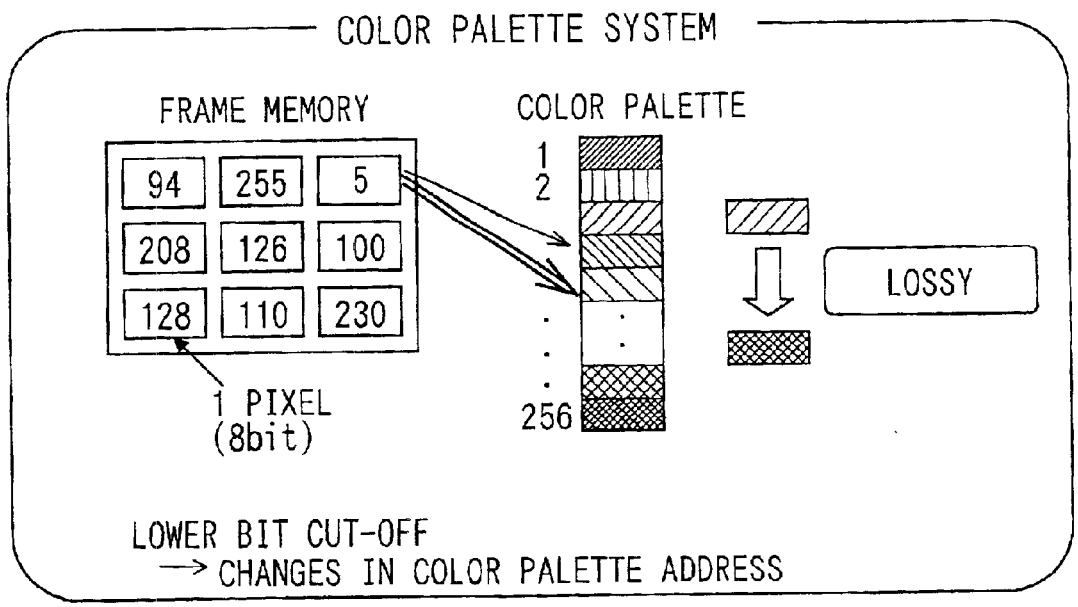

The direct color image has a data structure which is less susceptible to be influenced by the lossy data compression. That is, even when the lossy compression is carried out with respect to RGB values indicative of a color in the direct color image, if the decoded RGB values are approximated to original values thereof, then these decoded colors may be made equal to original colors as shown in FIG. 16A. However, there is no correlation relationship between an index of a color palette and color information (chromatic information). Thus, when the lower bit cut-off is made, the index is changed. It is thus likely that when the value of this index is only slightly changed by, for example, 1 (for instance, 99→100), the resultant color is completely changed from the original color (for instance, red→blue) as shown in FIG. 16B.

To avoid this problem in the color palette system, prior to the process operation executed in this data compressing unit 30, the reconstructing unit 100, reconstructs an index of the color palette. That is, with respect to a color corresponding to the index, a color contained in image data is properly allocated. This color is intentionally reconstructed in such a manner that this color may become "a color suitable for a data compression." Specifically, the indexes of the color palette is reconstructed in such a manner that the indexes of the continuous pixels may have close values to each other. These pixels are continued in a sequence (for instance, raster direction) of a data process operation within the image data.

Since the data converting unit 31 counts how many data are continued (that is, a plurality of same data "0" or "1" are continued) in the 2-value run-length converting operation, the larger the same data are continued, the higher the data compression rate is increased. As a result, the way how the data are continued may constitute a major technical aspect capable of improving the compression ratio. It is assumed here that plural pixels are continued within image data. Even when colors of these pixels are largely changed (for example, red pixel and blue pixel), if the indexes of the largely changed colors are approximated to each other, then there are great possibilities that more significant bits obtained when the indexes are resolved into bit planes can become equal to each other.

In this embodiment, while the index is represented by 8 bits, when indexes are continued, only the least significant bits (LSB) are different from each other. For instance, there are continuous indexes of "136" and "137". When these indexes are expressed in binary codes, these indexes become "10001000" and "10001001", respectively. In this index case, only the least significant bits thereof are different from each other, but more significant 7 bits of "1000100" are equal to each other. Also, there are continuous indexes of "137" and "138." When these indexes are expressed in binary codes, these indexes become "10001001" and "100010101", respectively. In this index case, only the lower significant 2 bits are different from each other. More significant 6 bits of "100010", are equal to each other.

Also, even when plural indexes are not continued, if the numeral values thereof are close to each other, then considerable number of more significant bits thereof are equal to each other when these pixels are expressed in binary codes (by bits). Therefore, in the case that the 2-value run-length converting process operation is carried out with respect to data of each resolved plane of the bit-plane, it becomes more likely that the same data are continued. Since the data are coded, the data compression ratio can be relatively increased.

If indexes are selected to be nearly equal to each other, then such a high possibility is so corrected that the more significant bits obtained when the indexes are resolved into the bit planes are equal to each other. However, for example, in a case that the indexes are selected to be "127" and "128", when these indexes are expressed in binary codes, the following bits "01111111" and "10000000" are obtained. All of these bits are not completely made coincident with each other. However, such a phenomenon only occurs in such a localized case of "bit carry" which may give an adverse influence to the more significant bits. As a consequence, such a possibility that the more significant bits obtained when the indexes are resolved into the bit planes are equal to each other would become relatively large.

To avoid such an inconvenient possibility that even when the indexes are approximated closely to each other, only small numbers of coincident bits are present, or none of coincident bits are present due to such an exceptional case, the following counter measure may be taken. That is, when the indexes are reconstructed in order to have the close values, such indexes are allocated by which a total number of planes where the data of the corresponding planes are equal to each other become relatively large. That is, like the indexes of "136" and "137", the indexes are allocated to the portion in which no adverse influence caused by the bit carry does not occur. As a consequence, the data compression efficiency can be further improved.

As described above, in this embodiment, the indexes are reconstructed in such a manner that the indexes of the pixels contained in the image data may have the approximated values, and these pixels are continued in the sequence of the data processing operation. When the index values can be made close to each other, the continuity of the data after being converted can be improved, and also the improvement in the data compression ratio can be further expected. Either one of the following methods may be employed to approximate the indexes.

(1) Indexes of color palette colors under use are made continuous.

The continuous indexes of the color palette are selected to be "0" to "255", that is 256 indexes. It is conceivable that there are certain indexes which are not used. In this case, while not-used indexes are separated, if the indexes of the color palette under use are made continuous, then the above indexes of the contained pixels can become closer values. Also, in this case, it is effective to apply this method in view of the coincident characteristic of the values of the bit planes. For instance, the range of indexes to be used is selected in such a manner that there is no such a relationship of the indexes corresponding to "bit carry (for example, 01111111→10000000 causing adverse influence up to more significant bit." Then, the indexes may be continued within this range. A similar idea may be applied to the following example.

(2) The indexes of the color palette are sequentially allocated in correspondence with a sequential order of colors which are used many times within the image data.

In accordance with this index allocation, the indexes of such colors which are used many times are made nearly equal to each other. Thus, the probability when the approximated values of the indexes contained in the image data are continued is increased. As a result, the higher improvement in the data compression ratio can be further executed. For example, when a map image is used, it is so assumed that an amount of a color used for a background is the largest value, and an amount of a color used for a road is the second largest value. In this case, there are many cases that the background is located adjacent to the road. If indexes corresponding to these background/road colors are continued, then the continuity of the data after being converted can be increased.

There are also many cases that a color of a road may be made different, depending upon a sort of this road. For example, while a plurality of colors are set as road colors, in a case that use amounts of these colors within an image are determined in this order of "background"→A sort of road (for example, city road)→B sort of road (for instance, state road)→C sort of road→D sort of road→E sort of road, - - - , indexes may be allocated in this order. As a result, since such indexes by which the continuity of the data after being converted can be improved may occur many times in this higher possibility order, the entire data compression ration can be increased.

(3) As to allocation of indexes:

When a large number of colors are employed in an image, the following method may be taken to determine how to allocate which index to the relevant color.

1) A pair of indexes is determined:

A pair of two colors are determined in accordance with the following determination method.

Among data located immediately preceding and following a color of interest, the largest numbers of color except for this color of interest are used as an index immediately preceding or following the color of interest. For example, considering the above example (2), first, both the background color and the A sort of road are used as a pair. Next, a pair of colors is determined in a recursive manner by employing a similar pair determining method with respect to colors which are not yet paired. That is, while the color of the B sort of road is paired with the color of the C sort of road, the color of the D sort of road is paired with the E sort of road. Then, the indexes of these paired colors are arranged in the color palette. As a consequence, since the index of the present pixel can be approximated to an index of such a pixel located immediately preceding or following this present pixel, the higher data compression ratio may be expected. This pixel implies such a pixel located adjacent to the present pixel in view of the sequence of the image processing operation.

2) A relationship between pairs is also considered:

The indexes are not always continuous between the pairs, although the indexes are made continuous in each index pair determined as above. Therefore, after determining the pair, the color which is used more among the pairs is designated as a representative color, and the indexes are allocated in order from the representative color which is relatively most used in the image data. For instance, in the case of above 1), the background color and the color of the A sort of road are determined to be the first pair. The colors of the B sort of road and the C sort of road are determined to be the second pair, and the colors of the D sort of road and the E sort of road are determined to be the third pair. In this instance, the representative colors of the three pairs are determined to be the background color, the color of the B sort of road and the color of the D sort of the road, respectively. Thus, the order of colors most used results in the background color→the color of the B sort of road→the color of the D sort of road. Therefore, the indexes are allocated in the order from the first pair, the second pair and the third pair.

As a result, the index of the present pixel can be made close to the indexes of the adjoining pixels. Furthermore, the indexes of such colors which are used many times can be made close to each other. Therefore, while observing the sequential order of the image process operation, the probability at which the close values of the indexes are continued is increased, and the higher compression ratio can be expected.

Figure 17:
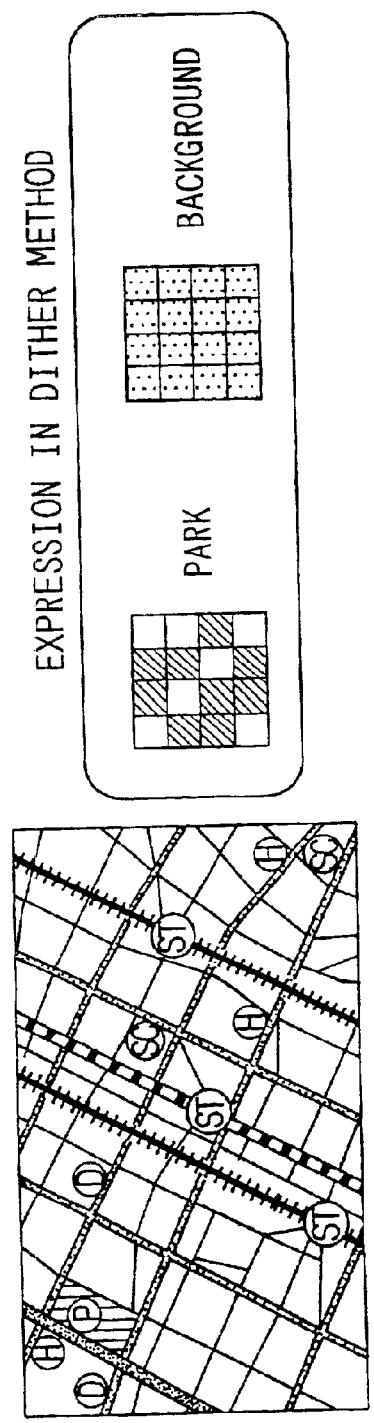
FIG. 17 is an explanatory diagram showing a display or expression based on the dither method contained in a map image.

(4) Adaptation to display or expression based on the dither method portion:

In the limited color representation using the color palette, in order to modify for a lack of color quantity, a half-tone color is produced by a "display or expression based on the dither method" in which the spatial frequency resolving is sacrificed. For example, half-tone colors may be used for the background and a park P in the map (FIG. 17). As a consequence, also as to this display or expression based on the dither method, indexes of adjoining colors are made nearly equal to each other.

Figure 18:
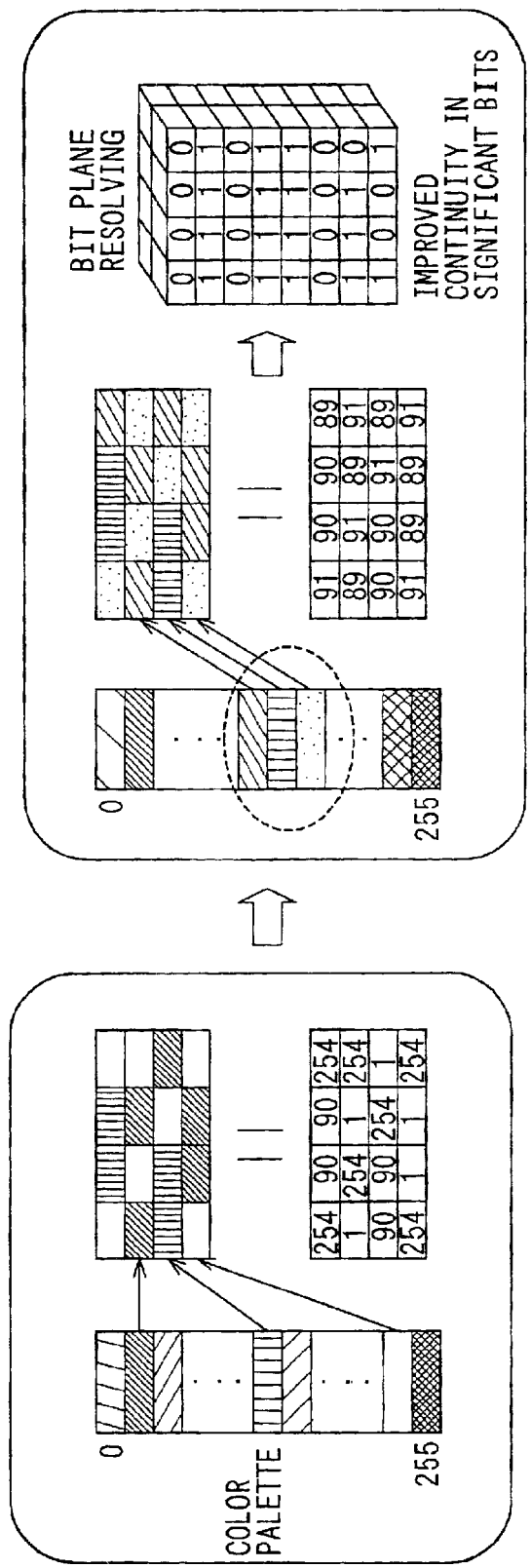
FIG. 18 is an explanatory diagram showing a method for improving a compression ratio in a case that a compression ratio in the color palette system is lowered.

It is assumed that there is no correlation relationship among the indexes corresponding to the colors used in this display or expression based on the dither method. In this instance, as shown in the left side in FIG. 18, even when the indexes are resolved into the bit planes, the data becomes random. That is, no continuity can be provided because the addresses of the display or expression based on the dither method color are so different. However, as shown in the right side in FIG. 18B, if the indexes are approximated to close values so that the display or expression based on the dither method color are arranged at close addresses, then the more significant plane has a small variation and the continuity is improved thereby to improve a compression ratio. In the case of such a dither indication, the color changing frequency degree is especially large. As a result, if no countermeasure is taken, it is highly likely that the discontinuity of the data after being resolved into the bit planes is increased. Therefore, it is necessary to take some countermeasures for this discontinuous portions to improve the compression ratio of the entire image.

Figure 19A:
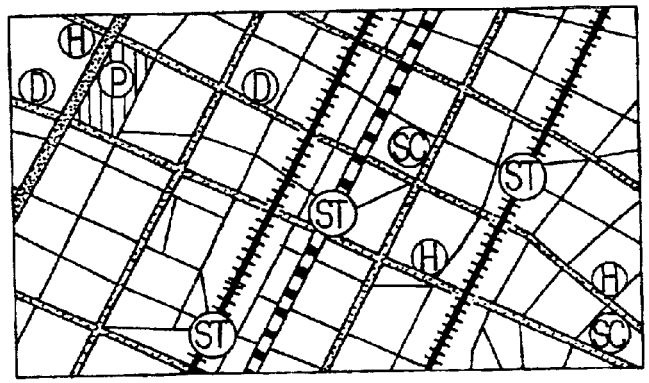
FIG. 19A is an explanatory diagram showing a map image on which a landmark is indicated.

(5) Adaptation to landmark display portion:

In some instances, in place of compressing a map image, only a part of the entire map image, for instance, landmark indications such as department stores D and train stations ST shown in FIG. 19A may be subjected the data compression. In this instance, indexes of colors used in these landmarks are made close to each other. There are many cases that a color arrangement of a landmark is originally determined. If the color palette is reconstructed in such a manner that the indexes of the colors used for the landmark are approximated to each other, then the continuity of the data can be improved and also the data compression ratio can be improved.

Figure 19B:
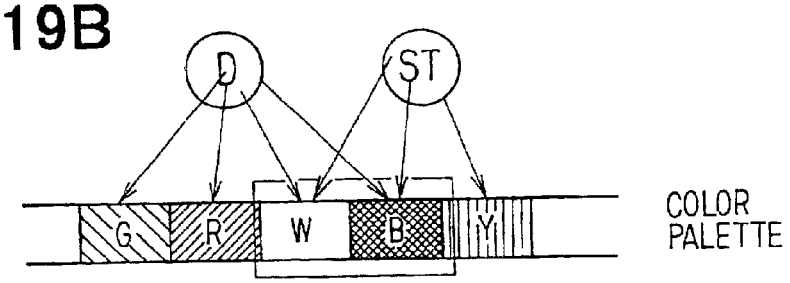
FIG. 19B is an explanatory diagram showing a method for effectively using a color palette.

The colors are arbitrarily allocated to the indexes of the color palette. For instance, in a case that a plurality of indexes corresponding to the same colors are present, there is a certain possibility that the entire indexes whose total number is limited cannot be used. In this instance, while there are 256 indexes in total, it is assumed that each of the same colors is allocated to two indexes, only a half of 256 colors (that is 128 colors) may be used. As a consequence, if the colors are commonly used for the landmark, then the color pallet can be effectively used as shown in FIG. 19B.

(6) Adaptation to other portion:

The landmark explained in the above (5) corresponds to an example of the specific elements used in the map image. That is, this is such a technical idea that the indexes of the colors used in the specific elements are made close to each other. In general, there are many opportunities that a landmark is constituted by a plurality of colors. As a consequence, the indexes of the colors used in this landmark are made nearly equal to each other. As the specific elements, for example, both the background and the road, and both the background and the symbol may be used. This is because the continuity of the background of the map image may be interrupted by the road and the symbol.

Figure 19C:
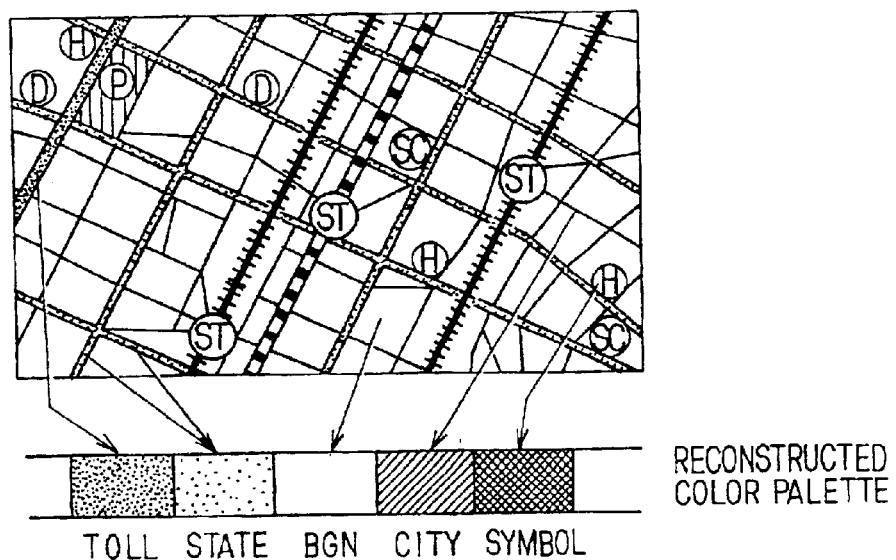
FIG. 19C is an explanatory diagram showing an example of a color palette reconstruction with respect to colors as to elements contained in the map image.

In this case, there are many cases that a plurality of indexes are used as the road color and the symbol colors. As a consequence, in this case, the indexes may be sequentially arranged to the indexes located close to the background color from the road color and the symbol color, which are used many times in the road map. For instance, it is assumed in FIG. 19C that the amount of use is large in the order of "city road" "state road"→"symbol" →"toll road." Both the index of "city road" and the index of "state road" are arranged adjacent to the index of the background color. Furthermore, the index of "symbol" and the index of "toll road" are arranged adjacent to these indexes. In accordance with this manner, the road color and the symbol color, which may interrupt the continuity of the background color, can be effectively arranged, so that the continuity of the data can be improved and the compression ratio can be increased.

In the case of the proposed comparative method shown in FIG. 6 and FIG. 7 in which the map image is employed as an example, an arbitrary color (e.g., background color) contained in the map image is selected so as to be separated into the modified color data and the selected position data, which are separately compressed. The modified color data corresponds to such data that the background portion is made identical to the color of the road. The color of this background corresponds to such a color which is relatively used many times within the map image data. In such an image that the background color is made equal to the road color, the continuity of the same color is considerably increased with respect to the original image data. That is, since the color is changed from the background into the road, or from the road to the background, the continuity of the data is interrupted.

However, since the above method is carried out, the continuity is increased. As a result, the length of the same data which is continued when the run-length conversion is carried out may relatively become long, so that the compression efficiency can be increased with respect to such an original image data which is not separated. As a result, even when the selected position data is separately compressed, the compression efficiency can be increased in total, as compared with such a case that the original data is directly compressed. This proposed comparative method may be combined with this sixth embodiment. In this case, the modified color data may be formed before/after the color palette is reconstructed, preferably before the color palette is reconstructed.

Further, in the proposed comparative method, the remaining data is used to replace the modified color data. That is, in the case of the modified color data, for example, the modification is carried out by using the road color instead of the selected background color. In the case of the remaining data, the background color is merely thinning-processed (extracted), but no modification is performed. Such a data used to indicate the extracted position is required. Such a method may be similarly combined with the sixth embodiment.

In the sixth embodiment, a map image is exemplified as the image data to be compressed. However, a natural image may be used. In the case of such a map image, the same colors are continued in the background area. Further, when the color is changed, this color change is sharp and the high frequency components of the spatial frequency are increased. As a result, the continuity of the more significant bits when the data is resolved into the bit planes is increased in this color change portion, the data compression ratio of the entire image can be largely increased.

(Seventh Embodiment)

Figure 20:
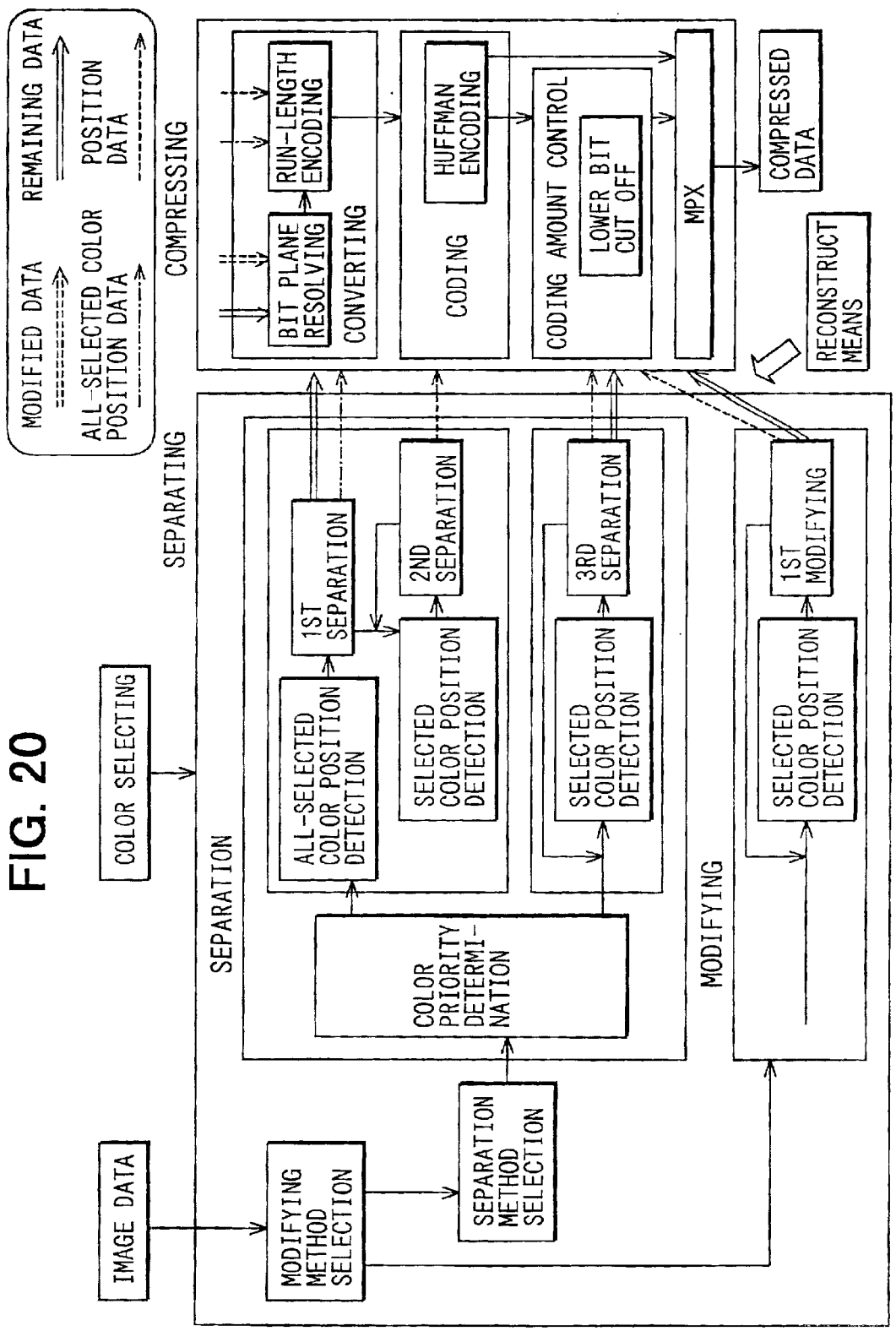
FIG. 20 is a block diagram showing an apparatus and a method according to a seventh embodiment which is a combination of the first to sixth embodiments.

The above embodiments may be combined into a seventh embodiment as shown in FIG. 20. In this embodiment, the input image data is applied to a modifying block and then to a compressing block in a manner similar to that shown in FIGS. 1A and 1B. The processing in the modifying block is executed as shown in FIGS. 2A to 2C. The input image data is also applied to a separation block and then to the compressing block in a manner similar to that shown in FIGS. 4A and 4B (FIG. 6) and FIG. 5. The process of FIGS. 4A and 4b is executed in detail as shown in FIG. 6. The data is separated by a separation method selection block in a manner similar to that shown in FIG. 11A before being applied to the separation block. In the separation block, a color priority determination block is constructed in a manner similar to that shown in FIG. 12. A reconstruction means is constructed in a manner similar to that shown in FIG. 14A.

The present invention should not be limited to the disclosed embodiments, but may be implemented in many other ways without departing from the spirit of the invention.

What is claimed is:

1. An image data compressing apparatus for compressing image data having a multiple value, comprising:

color selecting means for selecting an arbitrary color from the image data;

data separating means for separating the image data into modified data and position data, the modified data being produced by modifying a color of an image portion selected by the color selecting means by a color surrounding the image portion, and the position data indicating a position where the color image portion selected by the color selecting means is present; and data compressing means for compressing the modified data and the position data separately;

wherein the data separating means includes:

first data separating means for separating the image data into the position data, the modified data, and an all-selected color position data, the position data being constituted only by the selected color, the modified data being produced by extracting data of plural color image portions selected by the color selecting means from the image data, and the all-selected color position data indicating a position where all of the selected color image portions are present; and second data separating means operated in such a manner that the position data separated by the first data separating means is sequentially separated into position data and an image in an order of predetermined selected colors, the selected colors being located in the position data, and the image being produced by extracting the selected colors, wherein the data compressing means separately compress both the modified data and the all-position data which are separated by the first data separating means and the position data of the respective selected colors separated by the second data separating means.

2. The image data compressing apparatus as in claim 1, wherein:

the color selecting means selects a color which has caused spatial frequency of the image to increase.

3. The image data compressing apparatus as in claim 1, wherein:

the color selecting means selects a color which are relatively used frequently within the image data.

4. The image data compressing apparatus as in claim 2, wherein:

the color selecting means selects a road color contained in a map as a color which increases the spatial frequency, when the image data corresponds to the map.

5. The image data compressing apparatus as in claim 3, wherein:

the color selecting means selects a background color contained in a map as a color which is relatively used frequently within the image data, when the image data corresponds to the map.

6. The image data compressing apparatus as in claim 1, wherein:

the color selecting means selects a color which is instructed from an external device for executing a predetermined application software process operation by using the image data.

7. The image data compressing apparatus as in claim 2, wherein:

the color selecting means detects the color which increases the spatial frequency by employing the image data, and selects the detected color.

8. The image data compressing apparatus as in claim 3, wherein:

the color selecting means detects a color which is relatively used frequently within the image data, and selects the detected color.

9. The image data compressing apparatus as in claim 1, wherein:

the color selecting means selects a plurality of colors; and the position data is set by 1 bit for each of the plurality of colors.

10. The image data compressing apparatus as in claim 1, wherein:

the color selecting means is capable of selecting a plurality of colors; and the position data is set so that ($2^n-1$) pieces of colors are indicated by n bits.

11. The image data compressing apparatus as in claim 1, wherein:

the data compressing means has a single data compressing means to realize data compressing operations by sequentially compressing both the position data and the modified data.

12. The image data compressing apparatus as in claim 1, wherein the data compressing means includes:

data converting means for converting the image data to reduce entropy;

coding means for allocating a variable length code to the data converted by the data converting means; and coding amount control means for controlling a data amount of image data coded by the coding means, wherein the data converting means executes a converting process operation by way of a 2-value run-length conversion with respect to the position data, and also executes a converting process operation by way of a multi-value run-length conversion with respect to the modified data.

13. The image data compressing apparatus as in claim 1, wherein the data compressing means includes:

data converting means for converting the image data to reduce entropy;

coding means for allocating a variable length code to the data converted by the data converting means; and coding amount control means for controlling a data amount of image data coded by the coding means, the data converting means executes a converting process operation by way of a 2-value run-length conversion with respect to the position data, and also executes a converting process operation by way of the 2-value run-length conversion with respect to the modified data in such a manner that the modified data is resolved into a plurality of bit planes, and the data of each of the bit planes are sequentially converted by the 2-value run-length conversion either serially or in parallel.

14. The image data compressing apparatus as in claim 13, wherein:

the coding amount control means compresses the modified data in a lossy manner, and executes the data compressing process operation in a relatively high compression ratio.

15. The image data compressing apparatus as in claim 13, wherein:

the coding amount control means controls the coding amount in such a manner that a lossy data compressing process operation is carried out by sequentially cutting off the bit planes from such a bit plane having a low order with respect to the coding amount which is produced by coding the modified data by the coding means.

16. The image data compressing apparatus as in claim 13, wherein:

the data converting means executes a DCT process operation with respect to the modified data, instead of the run-length conversion.

17. The image data compressing apparatus as in claim 8, wherein:

the data compressing means executes the variable coding process operation by way of Huffman coding operation.

18. The image data compressing apparatus as in claim 1, further comprising:

means for variably switching the arbitrary color to be selected by the color selecting means.

19. An image data compressing apparatus for compressing image data having a multiple value, comprising:

color selecting means for selecting an arbitrary color from the image data;

data separating means for separating the image data into remaining data and position data, the remaining data being produced by eliminating a color of an image portion selected by the color selecting means from the image data, and the position data indicating a position where the color image portion selected by the color selecting means is present; and data compressing means for compressing the remaining data and the position data separately;

wherein the data separating means includes:

first data separating means for separating the image data into the position data, the remaining data and an all-selected color position data, the position data being constituted only by the selected color, the remaining data being produced by extracting data of plural color image portions selected by the color selecting means from the image data, and the all-selected color position data indicating a position where all of the selected color image portions are present; and second data separating means operated in such a manner that the position data separated by the first data separating means is sequentially separated into position data and an image in an order of predetermined selected colors, the selected colors being located in the position data, and the image being produced by extracting the selected colors, wherein the data compressing means separately compress both the remaining data and the all-position data which are separated by the first data separating means and the position data of the respective selected colors separated by the second data separating means.

20. The image data compressing apparatus as in claim 19, further comprising:

third data separating means operated in such a manner that the image data is separated into position data and remaining data, the remaining data being produced by extracting data of one color portion among arbitrarily selected plural color image portions from the image data, the all-position data indicating a position where the selected one color image portion is present, the remaining data being similarly separated into the remaining data and the position data, and the second compressing manner being carried out plural times equal to a total number of the plural colors;

second data compressing means for separately compressing the final remaining data separated by the third data separating means, and the position data obtained in the respective separating process operations; and compressing manner determining means for determining any one of a first compressing manner and a second compressing manner based upon an image feature of the image data, the first compressing manner being realized by employing the color selecting means, the first data separating means, the second data separating means and the first data compressing means, and the second compressing manner being realized by using the color selecting means, the third data separating means and the second data compressing means, wherein the image data is compressed by using the compressing manner determined by the compressing manner determining means.

21. The image data compressing apparatus as in claim 20, wherein:

the compressing manner determining means determines the compressing manner based upon a ratio of the remaining data to the entire image data, the remaining data being equal to data of the color image portion which is not selected by the color selecting means.

22. The image data compressing apparatus as in claim 19, wherein:

the image data compressing means further includes priority order determining means for determining priority orders of the plurality of selected colors; and the second data separating means sequentially separates the image data into the position data of the selected color and the extracted image of the selected color in the order of the high priority degree determined by the priority order determining means.

23. The image data compressing apparatus as in claim 22, wherein:

the data compressing means does not compress such position data having the lowest priority degree among the data separated by the second data separating means.

24. The image data compressing apparatus as in claim 19, wherein:

the color selecting means selects a color based upon a used amount among the image data.

25. The image data compressing apparatus as in claim 24, wherein:

the color selecting means selects a color which is instructed from an external device for executing a predetermined application software process operation by using the image data.

26. The image data compressing apparatus as in claim 24, wherein:

the color selecting means detects a color which is relatively used many times within the image data and selects the detected color.

27. The image data compressing apparatus as in claim 20, wherein:

the color selecting means selects a color based upon a used amount among the image data.

28. The image data compressing apparatus as in claim 27, wherein:

the priority degree determining means determines the priority degree in response to an instruction issued from an external device for executing a predetermined application software operation by using the image data.

29. The image data compressing apparatus as in claim 27, wherein:

the priority degree determining means detects a use amount of a color contained in the image data and determines a higher priority degree when the detected color use amount is large.

30. The image data compressing apparatus as in claim 19, wherein:

the data compressing means has means for compressing the respective separated data in parallel.

31. The image data compressing apparatus as in claim 19, wherein:

the data compressing means includes data converting means for converting the image data so as to reduce entropy, coding means for allocating a variable length code to the data converted by the data converting means, and coding amount control means for controlling a data amount of image data coded by the coding means; and the data converting means executes a converting process operation by way of a 2-value run-length conversion with respect to the position data of each of the selected colors, or the all-position data, and also executes a converting process operation by way of a multi-value run-length conversion with respect to the remaining data.

32. The image data compressing apparatus as in claim 19, wherein:

the data compressing means includes data converting means for converting the image data so as to reduce entropy, coding means for allocating a variable length code to the data converted by the data converting means, and coding amount control means for controlling a data amount of image data coded by the coding means; and the data converting means executes a converting process operation by way of a 2-value run-length conversion with respect to the position data of each of the selected colors, or the all-position data, and also executes a converting process operation by way of the 2-value run-length conversion with respect to the remaining data in such a manner that the remaining data is solved into a plurality of bit planes, and the data of each of the bit planes are sequentially converted by the 2-value run-length conversion in either a serial manner or a parallel manner.

33. The image data compressing apparatus as in claim 31, wherein:

the data converting means outputs a maximum value, and thereafter adds such a code whose run-length is equal to "0" in a case that the run-length equal to the output from the run-length conversion exceeds the maximum value in the run-length process operation.

34. The image data compressing apparatus as in claim 31, wherein:

the image data compressing means includes priority order determining means for determining priority orders of the plurality of selected colors; and the second data separating means sequentially separates the image data into the position data of the selected color and the extracted image of the selected color in the order of the high priority degree determined by the priority order determining means; and the priority degree determining means calculates a continuous degree of colors contained in the image data along the process direction, and sets a higher priority degree of such a color having a higher continuous degree.

35. The image data compressing apparatus as in claim 19, wherein:

the data compressing means produces a code which indicates that the all-position data and the remaining data separated by the first separating means or the position data of each selected color separated by the second data separating means are the same in all process operations.

36. The image data compressing apparatus as in claim 19, wherein:

the color selecting means selects a color which has caused spatial frequency of the image to increase.

37. The image data compressing apparatus as in claim 19, wherein:

the color selecting means selects a color which are relatively used frequently within the image data.

38. The image data compressing apparatus as in claim 36, wherein:

the color selecting means selects a road color contained in a map as a color which increases the spatial frequency, when the image data corresponds to the map.

39. The image data compressing apparatus as in claim 37, wherein:

the color selecting means selects a background color contained in a map as a color which is relatively used frequently within the image data, when the image data corresponds to the map.

40. The image data compressing apparatus as in claim 19, wherein:

the color selecting means selects a color which is instructed from an external device for executing a predetermined application software process operation by using the image data.

41. The image data compressing apparatus as in claim 36, wherein:

the color selecting means detects the color which increases the spatial frequency by employing the image data, and selects the detected color.

42. The image data compressing apparatus as in claim 37, wherein:

the color selecting means detects a color which is relatively used frequently within the image data, and selects the detected color.

43. The image data compressing apparatus as in claim 19, wherein:

the color selecting means selects a plurality of colors; and the position data is set by 1 bit for each of the plurality of colors.

44. The image data compressing apparatus as in claim 19, wherein:

the color selecting means is capable of selecting a plurality of colors; and the position data is set so that $(2^n-1)$ pieces of colors are indicated by n bits.

45. The image data compressing apparatus as in claim 19, wherein:

the data compressing means has a single data compressing means to realize data compressing operations by sequentially compressing both the position data and the remaining data.

46. The image data compressing apparatus as in claim 19, wherein the data compressing means includes:

data converting means for converting the image data to reduce entropy;

coding means for allocating a variable length code to the data converted by the data converting means; and coding amount control means for controlling a data amount of image data coded by the coding means, wherein the data converting means executes a converting process operation by way of a 2-value run-length conversion with respect to the position data, and also executes a converting process operation by way of a multi-value run-length conversion with respect to the remaining data.

47. The image data compressing apparatus as in claim 19, wherein the data compressing means includes:

data converting means for converting the image data to reduce entropy;

coding means for allocating a variable length code to the data converted by the data converting means; and coding amount control means for controlling a data amount of image data coded by the coding means, the data converting means executes a converting process operation by way of a 2-value run-length conversion with respect to the position data, and also executes a converting process operation by way of the 2-value run-length conversion with respect to the remaining data in such a manner that the remaining data is resolved into a plurality of bit planes, and the data of each of the bit planes are sequentially converted by the 2-value run-length conversion either serially or in parallel.

48. The image data compressing apparatus as in claim 47, wherein:

the coding amount control means compresses the remaining data in a lossy manner, and executes the data compressing process operation in a relatively high compression ratio.

49. The image data compressing apparatus as in claim 47, wherein:

the coding amount control means controls the coding amount in such a manner that a lossy data compressing process operation is carried out by sequentially cutting off the bit planes from such a bit plane having a low order with respect to the coding amount which is produced by coding the remaining data by the coding means.

50. The image data compressing apparatus as in claim 47, wherein:

the data converting means executes a DCT process operation with respect to the remaining data, instead of the run-length conversion.

51. The image data compressing apparatus as in claim 42, wherein:

the data compressing means executes the variable coding process operation by way of Huffman coding operation.

52. The image data compressing apparatus as in claim 19, further comprising:

means for variably switching the arbitrary color to be selected by the color selecting means.

53. An image data compressing method for compressing image data having a multiple value, comprising the steps of:

separating the image data into remaining data and position data, the remaining data being produced by eliminating data having an arbitrarily selected color image portion from the image data, and the position data indicating a position where the selected color image portion is present; and compressing the remaining data and the position data separately, wherein the separating step includes:

separating the image data into position data, remaining data and all-position data, the position data is constituted only by the selected color, the remaining data being produced by extracting data of arbitrarily selected plural color image portions from the image data, and the all-position data indicating positions where all of the selected color image portions are present; and separating sequentially the position data into position data and an image in an order of predetermined selected colors, the selected colors being located in the position data, and the image being produced by extracting the selected colors; and compressing the remaining data, the all-position data and the position data of each of the selected colors separately.

54. An image data compressing method for compressing image data having a multiple value, comprising the steps of:

separating the image data into remaining data and position data, the remaining data being produced by eliminating data having an arbitrarily selected color image portion from the image data, and the position data indicating a position where the selected color image portion is present;

compressing the remaining, data and the position data separately, determining to any one of a first compressing manner and a second compressing manner based upon an image feature of the image data to compress the image data by employing the determined compressing manner, wherein the first compressing manner is defined by a step in which the image data is separated into the position data, the remaining data and the all-position data, the position data is constituted only by the selected color, the remaining data is produced by extracting data of arbitrarily selected plural color image portions from the image data, and the all-position data indicates a position where all of the selected color image portions are present, wherein the first compressing method is also defined by a step in which the position data is sequentially separated into position data and an image in an order of predetermined selected colors, the selected colors are located in the position data, and the image is produced by extracting the selected colors, wherein the remaining data, the all-position data, and the position data of each of the selected colors are compressed separately, wherein the second compressing manner is defined by a step in which the image data is separated into position data and remaining data, the remaining data is being produced by extracting data of one color portion among arbitrarily selected plural color image portions from the image data, and the position data indicating a position where the selected one color image portion is present, and further the remaining data is similarly separated into the remaining data and the position data, and wherein the second compressing manner is carried out plural times equal to a total number of the plural colors.

55. A computer readable recording medium for recording thereon a computer program capable of causing a computer system to function as the respective means employed in the image data compressing apparatus as recited in claim 1 or 19.

56. An image data compressing apparatus comprising:

data converting means for solving image data having a multiple value, which is expressed by a color palette system, into bit planes, and also for sequentially executing a 2-value run-length converting process operation with respect to the data of each of the bit planes;

coding means for allocating a code to the data converted by the data converting means; and reconstructing means for reconstructing the color palette prior to a data converting operation by the data converting means in such a manner that indexes of pixels are approximated to be close to each other, and the pixels are continued in a data processing sequence within the image data;

wherein the reconstructing means determines a pair of two colors by employing a determining method that among data located preceding to and following a color of interest, the largest amount of such a color other than the color of interest is used as an index of a color located preceding to and following the color of interest, determines a pair of such colors which have not yet been determined in a recursive manner based upon the determining method, and then arranges the color palette every paired color.

57. The image data compressing apparatus as in claim 56, wherein:

the reconstructing means allocates the indexes so that the number of planes which have same values between data of corresponding planes relatively increases with respect to the indexes which are approximated to be close in a reconstructing operation.

58. The image data compressing apparatus as in claim 56, wherein:

the reconstructing means reconstructs the color palette in such a manner that color indexes of the color palette used in the image data are continued, and indexes of pixels continued in the image data have close values each other.

59. The image data compressing apparatus as in claim 56, wherein:

the reconstructing means sequentially allocates the color indexes of the color palette in correspondence with a sequence of colors whose amounts of use are large within the image data.

60. The image data compressing apparatus as in claim 56, wherein:

the reconstructing means sets that a first color of interest is selected to be a color which is relatively used many times within the image data.

61. The image data compressing apparatus as in claim 60, wherein:

the image reconstructing means determines respective pairs and thereafter sets such a color which is used many times within at least one pair of the respective pairs as a representative color, and sequentially allocates the indexes in an order from a representative color which is relatively most frequently used among the image data.

62. The image data compressing apparatus as in claim 56, wherein:

the reconstructing means reconstructs the color palette in such a manner that indexes of the plural colors for forming a half-tone color are continued, in a case that the image data represents the half-tone color by employing a plurality of colors.

63. The image data compressing apparatus as in claim 56, wherein:

the reconstructing means makes close to each other indexes of colors which are employed in a specific element among elements which constitute the map image, when the image data corresponds to a map image.

64. The image data compressing apparatus as in claim 63, wherein:

the specific element corresponds to a landmark indicated on the map image.

65. The image data compressing apparatus as in claim 64, wherein:

the reconstructing means arranges colors in such a manner that a color other than the commonly-used color which is used in one of two landmarks is continued to a preceding index of the commonly-used color, in the case that there is such a color commonly used in two landmarks; and the reconstructing means arranges colors in such a manner that a color other than the commonly-used color which is used in another landmark is continued to a succeeding index of the commonly-used color.

66. The image data compressing apparatus as in claim 63, wherein;

the specific element corresponds to a background and a road.

67. The image data compressing apparatus as in claim 66, wherein:

the reconstructing means sequentially arranges colors in an index close to a background color from a color of the road which is used many times within the image data.

68. The image data compressing apparatus as in claim 63, wherein:

the specific element corresponds to a background and a symbol.

69. The image data compressing apparatus as in claim 68, wherein:

the reconstructing means sequentially arranges colors in an index close to a background color from a color of the symbol which is used many times within the map image.

70. The image data compressing apparatus as in claim 63, wherein:

the reconstructing means sequentially arranges colors in an index close to a background color from a color of either a symbol or a road which is used many times within the map image.

71. The image data compressing apparatus as in claim 56, wherein:

the coding means allocates a variable length code to the data converted by the data converting means.

72. An image data compressing apparatus comprising:

data converting means for solving image data having a multiple value, which is expressed by a color palette system, into bit planes, and also for sequentially executing a 2-value run-length converting process operation with respect to the data of each of the bit planes;

coding means for allocating a code to the data converted by the data converting means; and reconstructing means for reconstructing the color palette prior to a data converting operation by the data converting means in such a manner that indexes of pixels are approximated to be close to each other, and the pixels are continued in a data processing sequence within the image data;

wherein:

the reconstructing means makes close to each other indexes of colors which are employed in a specific element among elements which constitute the map image, when the image data corresponds to a map image;

the specific element corresponds to a landmark indicated on the map image;

wherein:

the reconstructing means arranges colors in such a manner that a color other than the commonly-used color which is used in one of two landmarks is continued to a preceding index of the commonly-used color, in the case that there is such a color commonly used in two landmarks; and the reconstructing means arranges colors in such a manner that a color other than the commonly-used color which is used in another landmark is continued to a succeeding index of the commonly-used color.

73. An image data compressing apparatus comprising:

data converting means for solving image data having a multiple value, which is expressed by a color palette system, into bit planes, and also for sequentially executing a 2-value run-length converting process operation with respect to the data of each of the bit planes;

coding means for allocating a code to the data converted by the data converting means; and reconstructing means for reconstructing the color palette prior to a data converting operation by the data converting means in such a manner that indexes of pixels are approximated to be close to each other, and the pixels are continued in a data processing sequence within the image data;

wherein:

the reconstructing means makes close to each other indexes of colors which are employed in a specific element among elements which constitute the map image, when the image data corresponds to a map image;

the specific element corresponds to a background and a road; wherein:

the reconstructing means sequentially arranges colors in an index close to a background color from a color of the road which is used many times within the image data.

74. An image data compressing apparatus comprising:

data converting means for solving image data having a multiple value, which is expressed by a color palette system, into bit planes, and also for sequentially executing a 2-value run-length converting process operation with respect to the data of each of the bit planes;

coding means for allocating a code to the data converted by the data converting means; and reconstructing means for reconstructing the color palette prior to a data converting operation by the data converting means in such a manner that indexes of pixels are approximated to be close to each other, and the pixels are continued in a data processing sequence within the image data;

wherein: the reconstructing means makes close to each other indexes of colors which are employed in a specific element among elements which constitute the map image, when the image data corresponds to a map image;

wherein the specific element corresponds to a background and a symbol; and wherein the reconstructing means sequentially arranges colors in an index close to a background color from a color of the symbol which is used many times within the map image.

75. An image data compressing apparatus comprising:

data converting means for solving image data having a multiple value, which is expressed by a color palette system, into bit planes, and also for sequentially executing a 2-value run-length converting process operation with respect to the data of each of the bit planes;

coding means for allocating a code to the data converted by the data converting means; and reconstructing means for reconstructing the color palette prior to a data converting operation by the data converting means in such a manner that indexes of pixels are approximated to be close to each other, and the pixels are continued in a data processing sequence within the image data;

wherein: the reconstructing means makes close to each other indexes of colors which are employed in a specific element among elements which constitute the map image, when the image data corresponds to a map image; and wherein: the reconstructing means sequentially arranges colors in an index close to a background color from a color of either a symbol or a road which is used many times within the map image.

76. A computer readable medium for recording thereon:

a computer program capable of causing a computer system to function as the data converting means, the coding means, and the reconstructing means of the image data compressing apparatus as recited in claim 56.

* * * * *